(12) United States Patent
Thakare

(10) Patent No.: US 8,050,219 B2
(45) Date of Patent: Nov. 1, 2011

(54) LOGICAL PROTOCOL ARCHITECTURE FOR WIRELESS METROPOLITAN AREA NETWORKS

(75) Inventor: Kiran Thakare, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 431 days.

(21) Appl. No.: 12/268,608

(22) Filed: Nov. 11, 2008

(65) Prior Publication Data

US 2009/0168710 A1    Jul. 2, 2009

Related U.S. Application Data

(60) Provisional application No. 61/020,937, filed on Jan. 14, 2008, provisional application No. 60/988,315, filed on Nov. 15, 2007.

(51) Int. Cl.
| | |
|---|---|
| H04W 4/00 | (2009.01) |
| H04L 12/28 | (2006.01) |
| H04L 12/56 | (2006.01) |
| H04J 3/16 | (2006.01) |
| H04J 3/22 | (2006.01) |

(52) U.S. Cl. .......................... 370/328; 370/392; 370/469
(58) Field of Classification Search .................. 370/328, 370/389, 392, 469
See application file for complete search history.

(56) References Cited

U.S. PATENT DOCUMENTS

| 7,684,439 | B2 * | 3/2010 | Han et al. ....................... 370/474 |
| 2003/0210669 | A1 * | 11/2003 | Vayanos et al. ............... 370/335 |

OTHER PUBLICATIONS

Attachment 4-1-9; End-to-End Network Systems Architecture; WiMax Forum Network Architecture (Stage 3: Detailed Protocols and Procedures), Release 1.1.0, Jul. 11, 2007; WiMax Forum Proprietary (520 pages).

802.16 IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; New York, NY (895 pages).

802.16e IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands; *and* Corrigendum 1; IEEE Computer Society and the IEEE Microwave Theory and Techniques Society; Feb. 28, 2006 (864 pages).

* cited by examiner

*Primary Examiner* — Ronald Abelson
(74) *Attorney, Agent, or Firm* — Nixon & Vanderhye P.C.

(57) ABSTRACT

In one aspect, a new radio protocol architecture is proposed. The proposed architecture is applicable to wireless networks such as a wireless metropolitan area network (WMAN). In the new architecture, there is a clear-cut separation of control, management, and data planes. New control service access points (SAP) are introduced to allow interaction between the protocol layers of the architecture. Also, data SAPs are introduced between the protocol layers. The layer separation idea extracts the functionalities of the architecture and grouped into MAC CPS-H (common part sublayer-high) and MAC CPS-L (common part sublayer-low). Further, a new concept of "control information base" (CIB) is introduced.

32 Claims, 16 Drawing Sheets

PRIOR ART

LOGICAL PROTOCOL ARCHITECTURE FOR WIRELESS METROPOLITAN AREA NETWORKS

CROSS REFERENCE

This application is related to U.S. provisional patent application 61/020,937, filed Jan. 14, 2008, entitled "Logical Protocol Architecture For Wireless Metropolitan Area Networks" and 60/988,315, filed Nov. 15, 2007, entitled "An Evolved Protocol Architecture for IEEEE802.16m", which are incorporated by reference herein in its entirety.

TECHNICAL FIELD

The disclosed technology relates to systems and methods to implement a logical radio protocol architecture for wireless networks including wireless metropolitan area networks.

BACKGROUND

An example of a wireless metropolitan area network (WMAN) 100 is illustrated in FIG. 1. The WMAN 100 includes one or more base stations (BS) 110 each communicating over a radio link (R1) with one or more mobile stations (MS) 120. Each BS 110 can also communicate with an access service network gateway (ASN-GW) 130 (or simply, ASN) over another communication (R6) link. The ASN 130 may further communicate with a connectivity service network (CSN) over an R3 link (not illustrated).

The BS 110 and the MS 120 can communicate with each other according to an existing radio protocol architecture such as the WiMax OFDMA WMAN IEEE 802.16e as illustrated in FIG. 2. The existing IEEE 802.16e standard defines two major layers—the physical (PHY) and the medium access control (MAC) layers. The PHY layer generally corresponds to layer 1 (L1) and the MAC layer generally corresponds to layer 2 (L2) and may include some layer 3 (L3) functionalities.

The MAC layer itself is further split into sublayers including the service-specific convergence sublayer (CS), the MAC common part sublayer (CPS), and the security sublayer. As the name suggests, the CS sublayer provides service specific convergence functions. These generally include mapping external network data, such as ATM or packet (e.g., IP) data, into MAC service data units (SDU) which are sent to the MAC CPS sublayer.

The MAC CPS sublayer performs MAC functionalities such as packing/unpacking the MAC SDUs to MAC protocol data units (PDU) and scheduling the MAC PDUs for delivery to the MS 120 via the PHY layer. Additionally, the CPS sublayer includes the management/control functionalities such as system information broadcast and MS state.

The MAC security sublayer provides MAC PDU encryption services and privacy key management between the BS 110 and the MS 120 to enforce conditional access to the network services.

The PHY layer provides typical physical layer functions including coding, modulation, and MIMO processing.

FIG. 2 shows the two major operational planes of the architecture, one being the data (or user) plane and the other being the management/control plane. The management/control plane includes two types of functionalities: radio resource control (RRC) functionalities and management functionalities. The management/control plane holds a management information base (MIB) that contains radio control information as well as network management information. The CS, CPS, and the security sublayers of the MAC layer interface with the management/control plane components of the architecture and the MIB. The PHY layer also interfaces with the management/control plane components of the architecture.

The existing radio protocol architectures illustrated in FIG. 2 has flaws. For example, the existing protocol layer is a mixture of L3 and higher layer functionalities in L2. Also, the management/control plane interfaces with each of the MAC sublayers as well as with the PHY layer. In short, the structure of the existing radio protocol architecture is not logical.

While such issues may not bring significant problems with isolated deployments, these limitations could pose significant hindrances to system migration and can increase operational expenditures. The mix of protocol layer functionalities introduces interoperability problems as well as problems to migration and evolution of protocol stack. The mixture of protocol layer functionalities also restricts the options for various deployments scenarios ASN profile A, B, C deployment as per the following document: WiMax Forum Network Architecture—Stage 3—Detailed Protocols and Procedures—Release 1.1.0. Additionally this may add to downgrading of system performance especially for inter-RAT (radio access technology) system mobility.

SUMMARY

In one aspect, a new radio protocol architecture is proposed. The proposed architecture is applicable to wireless networks such as a wireless metropolitan area network (WMAN). In the new architecture, there is a clear-cut separation of control, management, and data planes. New control service access points (SAP) are introduced to allow interaction between the protocol layers of the architecture. Also, data SAPs are introduced between the protocol layers. The layer separation idea extracts the functionalities of the architecture and grouped into MAC CPS-H (common part sublayer-high) and MAC CPS-L (common part sublayer-low). Further, a new concept of "control information base" (CIB) is introduced.

In one example embodiment, the new radio protocol architecture is layered into the network layer (L3), the data link layer (L2), and the physical layer (L1), and L2 is further is split into the MAC CPS-L and CS sublayers. The L3 layer includes an RRC layer within the MAC CPS-H sublayer.

The example radio protocol architecture embodiment provides inter-layer interfaces as control and data SAPs. The control SAPs transfer control related information necessary for protocol layer functioning, such as between the RRC (in the CPS-H sublayer) and the PHY layer. In particular, the example radio protocol architecture embodiment allows for communication of control information between L1 and L3 layers.

The example radio protocol architecture embodiment also defines data SAPs used to transfer actual user data streams between the layers. The CIB and the MIB are separately maintained in a preferred embodiment.

The example radio protocol architecture may be implemented in the base station, the mobile station, the access service network gateway, or any other nodes of the WMAN.

The embodiments provide at least the following advantages among others:

Simplicity.
Cost reduction from future upgrade and evolution.
Separation of control plane, user plane and management plane.
Ease of implementation, operation, evolution, migration and maintenance.

Efficient maintenance management and radio management.

Ease of deployment when considering the ASN A, B, C profile.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
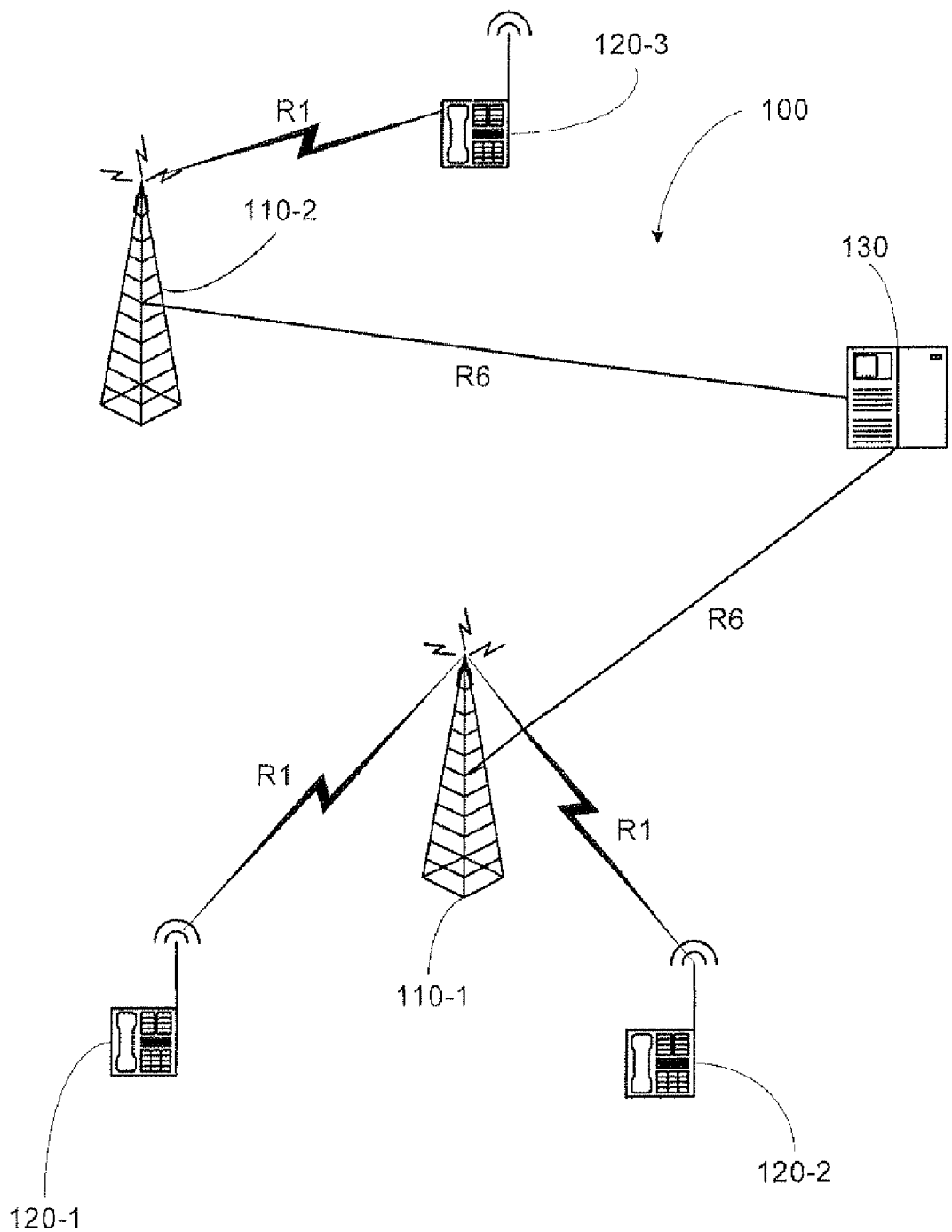
FIG. 1 illustrates an example of a wireless metropolitan area network.
Figure 2:
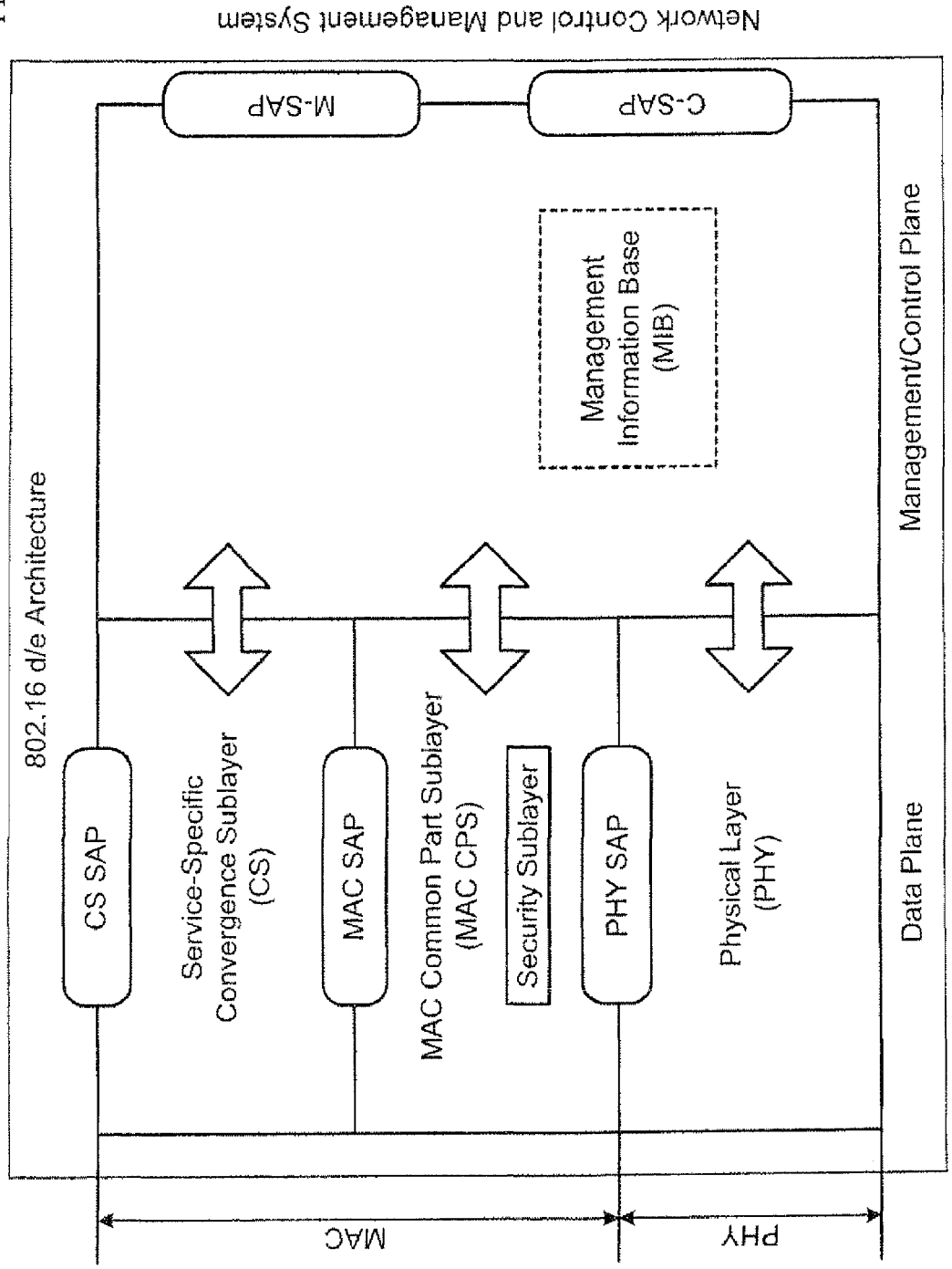
FIG. 2 illustrates an embodiment of a conventional wireless radio protocol architecture.

As noted above, the existing radio protocol architecture illustrated in FIG. 2 has several flaws including, among others:

Inflexible implementation options.

Mix of radio control plane, management plane, and radio data plane.

Ambiguous inter-protocol layer interfaces.

Not compatible with standards such as Open Base Station Architecture Initiative (OBSAI) and Common Public Radio Interface (CPRI).

The ambiguity in the existing standards adds problems to system evolution. Vendors may interpret such ambiguity as an implementation option across various protocol layers. This can significantly increase complexity bringing hindrances to operation, interoperability, upgrade and to the evolution of the system. Hence, it is desirable to define the radio protocol architecture in a clean manner without ambiguity. One way to address this is to provide for explicit control and data service access point (SAP) definitions between the protocol layers and provide protocol layer separation as per the functionalities.

Similarly, a division of the radio management/control plane into separate control plane and management plane is desirable. In the existing architecture, the management/control plane includes the functionalities related to the radio control and with management functionalities such as network management, mobility management, etc.

The existing WiMAX standard mandates that the complete management/control plane be implemented in the BS. This means that the BS must include the MIB which contains both the subscribers lifetime information and the active session information. This makes it difficult to scale, design, deploy, and maintain the BS as the numbers of MS and/or the relay stations connected to the BS grow.

The existing architecture is mixed with implementation view leading to ambiguity and various interpretations and mandates that all of the entities be implemented in BS. It is, therefore, desirable to have a logical protocol architecture that addresses these flaws. Additionally, it is also desirable to minimize the architectural implementation options in the protocol architecture.

To address these and other issues, the inclusion of at least the following concepts are suggested:

Have a clear-cut separation of control, management and user (data) planes.

Introduce new control SAPs to allow interaction between the protocol layers.

Introduce new data SAPs between the protocol layers.

Separate MAC CPS functionalities and group them into two parts as higher and lower sublayers CPS-H and CPS-L, respectively, to separate the data and control functions of the MAC.

Introduce the concept of a control information base (CIB).

Figure 3:
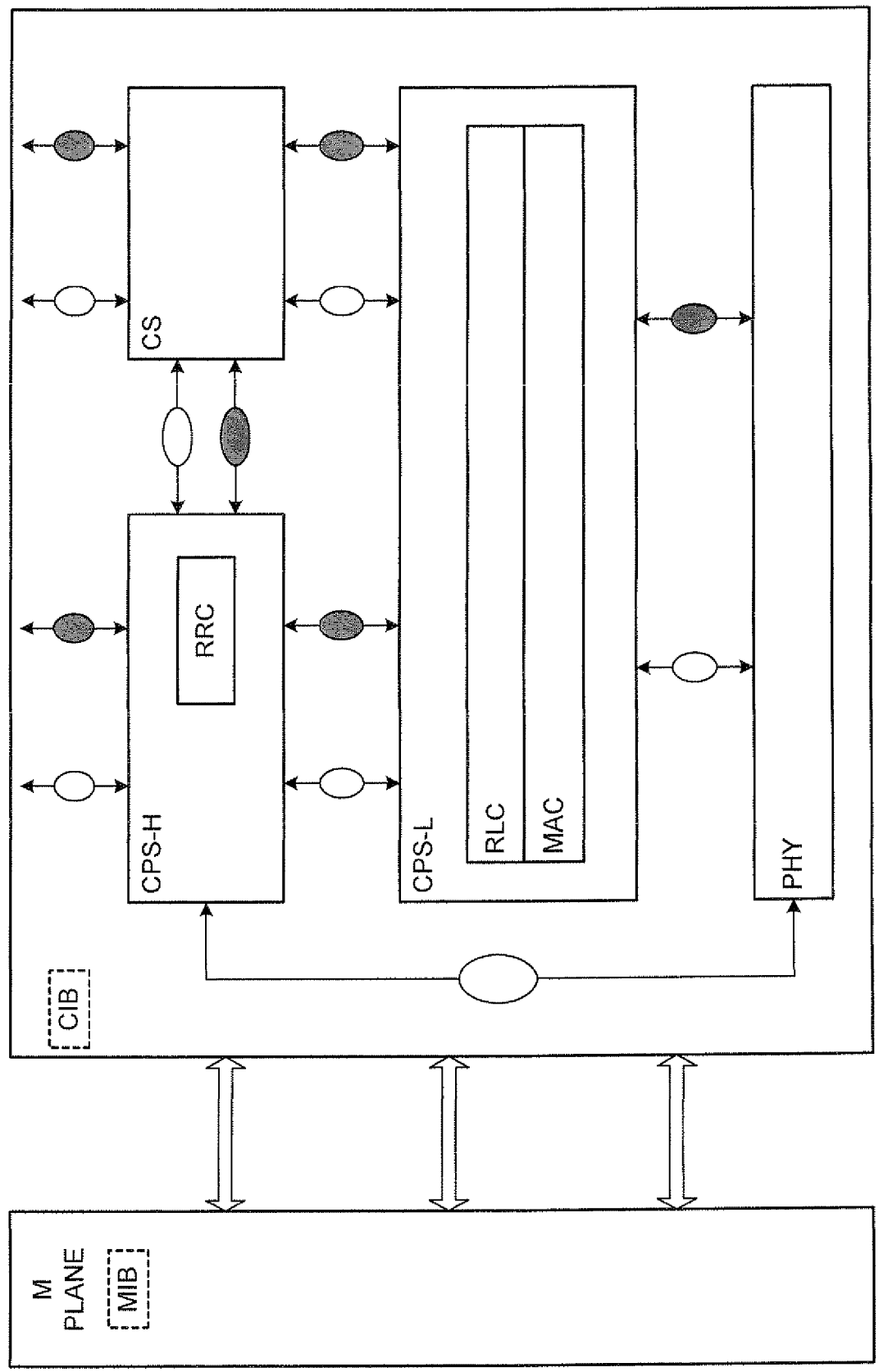
FIG. 3 illustrates an example embodiment of a radio protocol architecture.

The above indicated concepts are incorporated a newly proposed radio protocol architecture illustrated in FIG. 3. The example radio protocol architecture is layered into three layers—the network layer (L3), the data link layer (L2), and the physical layer (L1). L2 is further is split into MAC CPS-L and the CS sublayer. The CPS-L sublayer includes RLC (radio link control) and MAC functionalities. Part of the L3 is shown as the RRC layer within the MAC CPS-H sublayer. The L3, i.e., the CPS-H sublayer, exists in the control plane and the CS sublayer exist in the data plane, also referred to as the user plane.

The example radio protocol architecture provides interlayer interfaces as control SAPs and data SAPs represented by circles interconnecting the protocol layers. The light circles represent the control SAPs and shaded circles represent data SAPs. The control SAPs transfer control related information necessary for protocol layer functioning. As an example, the control SAP between the CPS-H sublayer and the PHY layer—the RRC-PHY control SAP (described in more detail below)—can be used to transfer radio link related information such as measurement reports (timing advance, inter/intra RAT, etc.) from the PHY layer to the CPS-H sublayer. Other RRC information can be exchanged over the RRC-PHY control SAP.

The example architecture illustrated in FIG. 3 is superior to the existing architecture in many ways. First, there is a clear-cut separation of control, management, and user planes. The management plane primarily deals with network functionalities such as installment, system configuration, system resource monitoring, alarms, and so on. The management plane exists between the BS and a network management system (NMS) and between the MS and NMS.

The control plane primarily deals with radio control functionalities to manage the peer-to-peer radio resources such as the RRC functionalities. The control plane manages the radio control information between BS and MS. It includes control signaling for connections, MS/BS state, MS mobility, and so on.

The user plane primarily deals with transferring actual user data streams.

The separation of the planes allows for evolution of the protocol architecture functionalities. For example, the management plane can be moved into a network entity (NE) management node aligning with the TMN model [e.g., ITU TMN Model]. The control plane can be implemented in various nodes as per the ASN profile A, B, C reference [see, e.g., WiMax Forum Network Architecture—Stage 3—Detailed Protocols and Procedures—Release 1.1.0] to meet the operator deployment requirements in a cost effective manner.

The second way the example architecture is superior is that the concept of a CIB (control information base) is introduced. In some respects, the old MIB is split into the new CIB and MIB. The CIB can include active radio link (RL) related information, also referred to as the MS context. CIB may include the active service flow, link IDs, and measurement information for radio connection. In a preferred embodiment, the CIB is maintained in the context of the control plane.

The new MIB can be used to maintain a life time information of a subscriber and/or node. These include network node installation, network configuration, network resource monitoring, network alarms, and long term MS information such as the subscription details of the subscriber. The MIB can be considered as a part of the NMS. The NMS may be implemented within the BS or as an separate unit external to the BS. In a preferred embodiment, the MIB is maintained in the context of the management plane. Note that it is preferred to separate the MIB from the CIB.

In a third way, new control and data SAPs are introduced. The new SAPs allow interaction between the protocol layers, such as between the RRC (in the CPS-H sublayer) and the PHY layer. Control SAPS allow the transfer of control related information that are desirable for protocol layer functioning. Communication of control information between the L1 and L3 is highly desirable. However, in the existing architecture illustrated in FIG. 2, there is no such provision. But in the example architecture of FIG. 3, the CPS-H sublayer (including the RRC) can exchange control information with the PHY layer through the RRC-PHY control SAP.

In the example architecture, at least the following control SAPs are defined.

RRC-PHY control SAP to transfer RRC control information between the CPS-H sublayer and the PHY layer. The control information transferred includes signal strength, signal-to-noise ratio (SNR), RSSI, timing advance, and interference measurement.

RRC control SAP to transfer control information between the CPS-H sublayer and a higher layer implementing a transport protocol above the L3 layer.

RRC-CS control SAP to transfer control information between the CPS-H sublayer and the CS sublayer. These can include connection control related information.

RRC-MAC control SAP to transfer the control information between the CPS-H sublayer and the CPS-L sublayer.

CS control SAP to transfer control information between the CS sublayer and the higher layer.

CS-MAC control SAP to transfer control information between the CS sublayer and the CPS-L sublayer.

MAC-PHY control SAP to transfer control information between the CPS-L sublayer and the PHY layer.

The example architecture also defines data SAPs, which are used to transfer actual user data streams between the layers. In the architecture of FIG. 3, at least the following data SAPs are defined.

RRC data SAP to transfer user data (usually in a form of higher layer protocol data units (PDU)) from the higher layer to the CPS-H sublayer and vice versa. The CPS-H sublayer can convert the higher layer PDUs into RRC SDU and vice versa.

RRC-MAC data SAP to transfer the RRC-SDUs from the CPS-H sublayer to the CPS-L sublayer and vice versa. The CPS-L sublayer can convert the RRC-SDUs into MAC PDUs and vice versa.

CS data SAP to transfer the user data from the higher layer to the CS sublayer and vice versa. The CS sublayer can convert the user data into CS-SDUs and vice versa.

CS-MAC data SAP to transfer the CS-SDUs from the CS to the CPS-L sublayer. The CPS-L sublayer can convert the CS-SDUs into MAC PDUs and vice versa.

MAC-PHY data SAP to transfer the MAC PDUs from the CPS-L sublayer to the PHY layer. The PHY layer can convert the MAC PDUs into PHY PDUs and vice versa.

RRC-CS data SAP to transfer the RRC-SDUs from the CPS-H sublayer to the CS sublayer and vice versa. The CS sublayer can convert the RRC-SDUs into CS-SDUs and vice versa.

In a fourth way, the layer separation extracts the functionalities and groups them into appropriate layers. As an example, the MAC-CPS is divided in two parts as common part-high and -low sublayers, CPS-H sublayer and CPS-L sublayer, respectively, to accommodate this extraction. The control functionalities such as the RRC are moved to higher MAC CPS-H sublayer. These functionalities include:

System information broadcast.
MBS.
Connection establishment, maintenance and tear down.
Mobility (connection-handover; idle mode, sleep mode mobility)
Interference management.
Power control.
Paging.
Measurements (timing advance control, inter/intra RAT, etc) related.

New functionalities can easily be introduced into the CPS-H sublayer including power control, connections state of MS/BS, and so on, which are desirable for the radio resource management (RRM) to function properly. The RRM functionalities are implementation specific and may be implemented in various protocol layers. Hence, the RRM is not illustrated in the architecture of FIG. 3 since FIG. 3 is a protocol layer view and not a functional view.

The CPS-L sublayer can include the existing MAC functionalities, which include among others:

ARQ, Segmentation/delivery.
Fragmenting and defragmenting.
Packing and unpacking.
Multiplexing and demultiplexing.
MAC PDU forming.
Reporting measurements.
Scheduling.
Framing, controlling, and signaling.
QoS.
Ranging, link adaptation, and interference management.

As illustrated in FIG. 3, it is preferred that the RLC functionalities be moved to the CPS-L sublayer. This can ease implementation of the MAC and CS sublayers and allow adaptation to various radio conditions and quality.

Figure 4A:
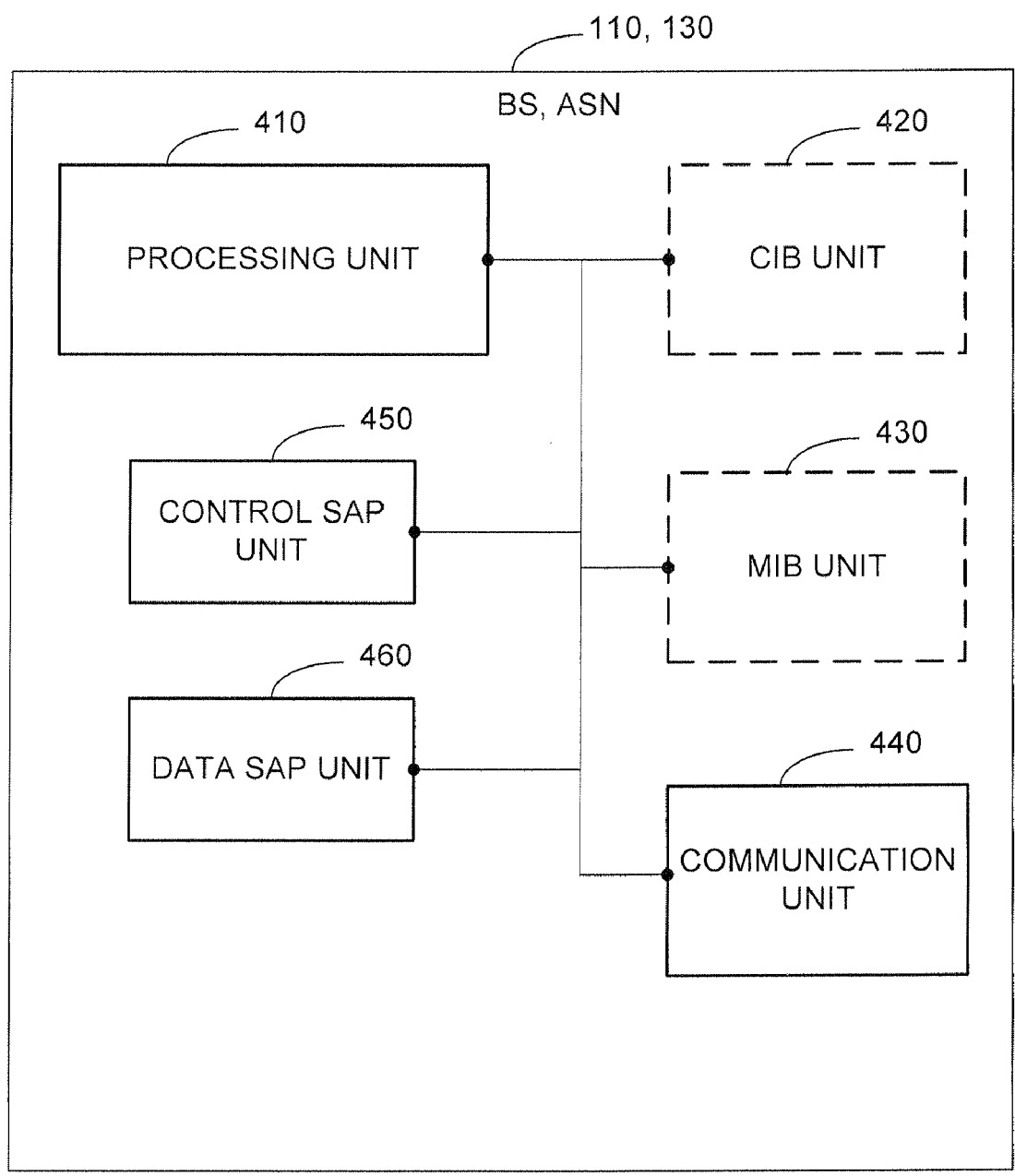
FIG. 4A illustrates an example embodiment of the base station and/or an access service network of a wireless network arranged to implement the radio protocol architecture of FIG. 3.
Figure 4B:
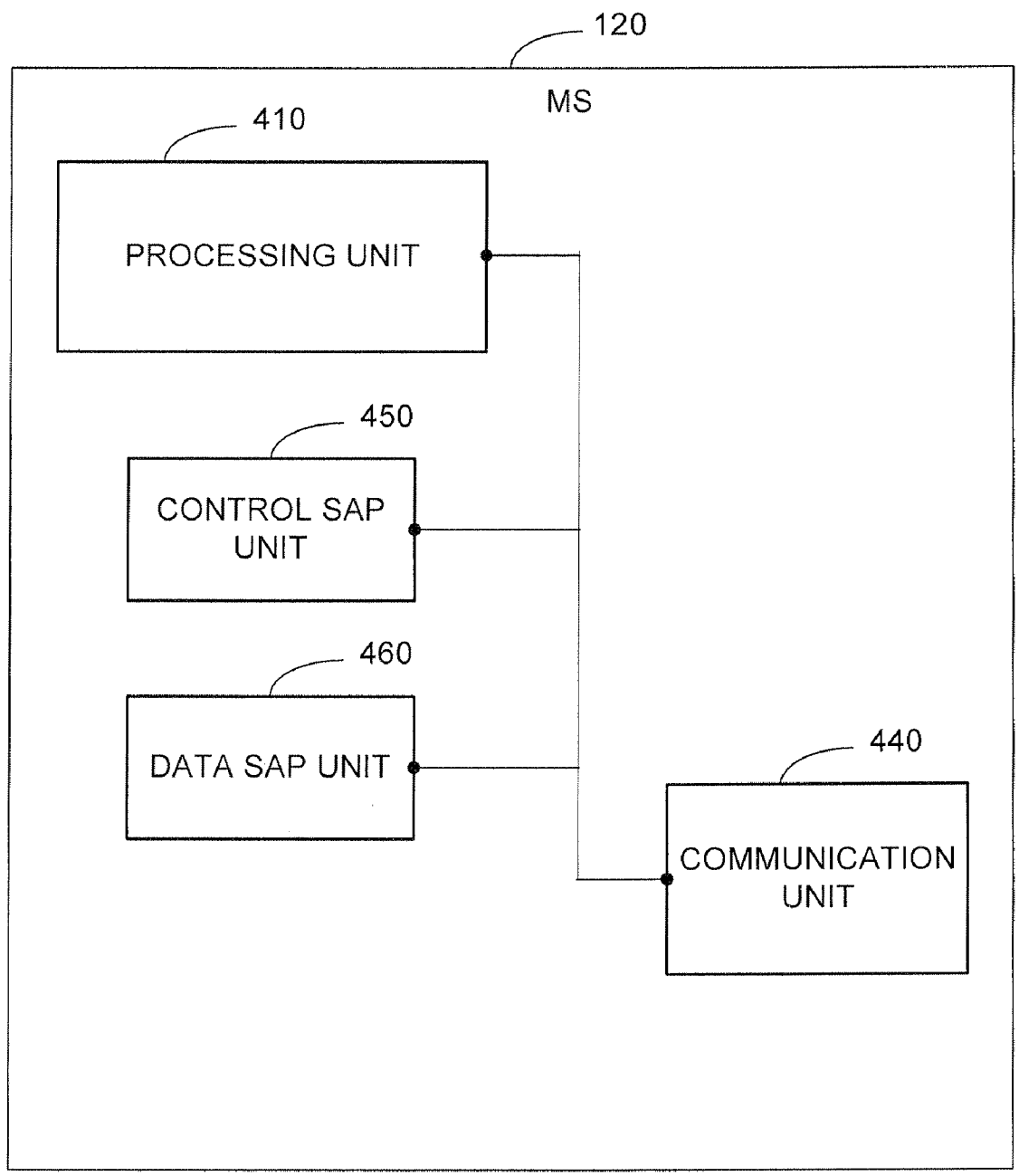
FIG. 4B illustrates an example embodiment of the mobile station of a wireless network arranged to implement the radio protocol architecture of FIG. 3.

The example radio protocol architecture may be implemented in any of the nodes of the network 100. That is, the architecture may be implemented in the BS 110, the ASN 130, and the MS 120 as illustrated in FIGS. 4A and 4B. In FIG. 4A, the example embodiment of the BS 110 or the ASN 130 can include a processing unit 410, a CIB unit 420, a MIB unit 430, a communication unit 440, a control SAP unit 450, and a data SAP unit 460. Together, these units 410-460 are arranged to implement the new radio protocol architecture such as the example architecture illustrated in FIG. 3.

Note that the CIB unit 420 and the MIB unit 430 are optional in that they need not be a part of the BS 110 or the ASN 130. It is only necessary that the CIB unit 420 and the MIB unit 430 be accessible to the BS 110 or the ASN 130 if they are implemented externally. But in a preferred embodiment, the CIB unit 420 is implemented in the BS 110. The MIB 420 can also be implemented in the BS 110 or in the ASN 130 or as a separate standalone unit reachable by the BS 110 or the ASN 130.

FIG. 4B illustrates an example embodiment of the MS 120. The MS 120 differs from the BS 110 in that the CIB unit 420 and the MIB unit 430 are not strictly necessary. The MS 120 can include all other units 410 and 440-450. Again, these units are arranged to implement the new radio protocol architecture.

In both FIGS. 4A and 4B, the units 410-460 are separated from each other only for illustration purposes. The specific implementations can be accomplished in many ways. Each unit may be implemented in software, hardware, firmware, or in any combination. Further, two or more units can be combined into a single integral unit.

For ease of description, each of the BS 110, ASN 130, and the MS 120 is referred to as the node of the network 100. In the example embodiments illustrated in FIGS. 4A and 4B, the node includes the processing unit 410. The processing unit 410 is arranged to control the operations of the other units 420-460 so as to implement the example radio protocol architecture illustrated in FIG. 3.

The node also includes the communication unit 440 arranged to communicate with other nodes of the network. For example, the communication units of the MS 120 and the BS 110 communicate with each over the R1 radio link. The BS 110 and the ASN 130 communicate with each other over the R6 link. It should be noted that the MS 120 and the ASN 130 can communicate with each other through the BS 110.

The node further includes the data SAP unit 460 and the control SAP unit 450. The data SAP unit 460 is arranged to carry user data between the protocol layers of the architecture and among nodes of the network. The control SAP unit 450 is arranged to transfer RRC information to implement the protocol layers of the radio protocol architecture including amongst the units of the node that implement the L1, L2, and L3 functions. In one example, the L1 is the PHY layer, L2 is the MAC layer, and L3 is the RRC layer.

Figure 5:
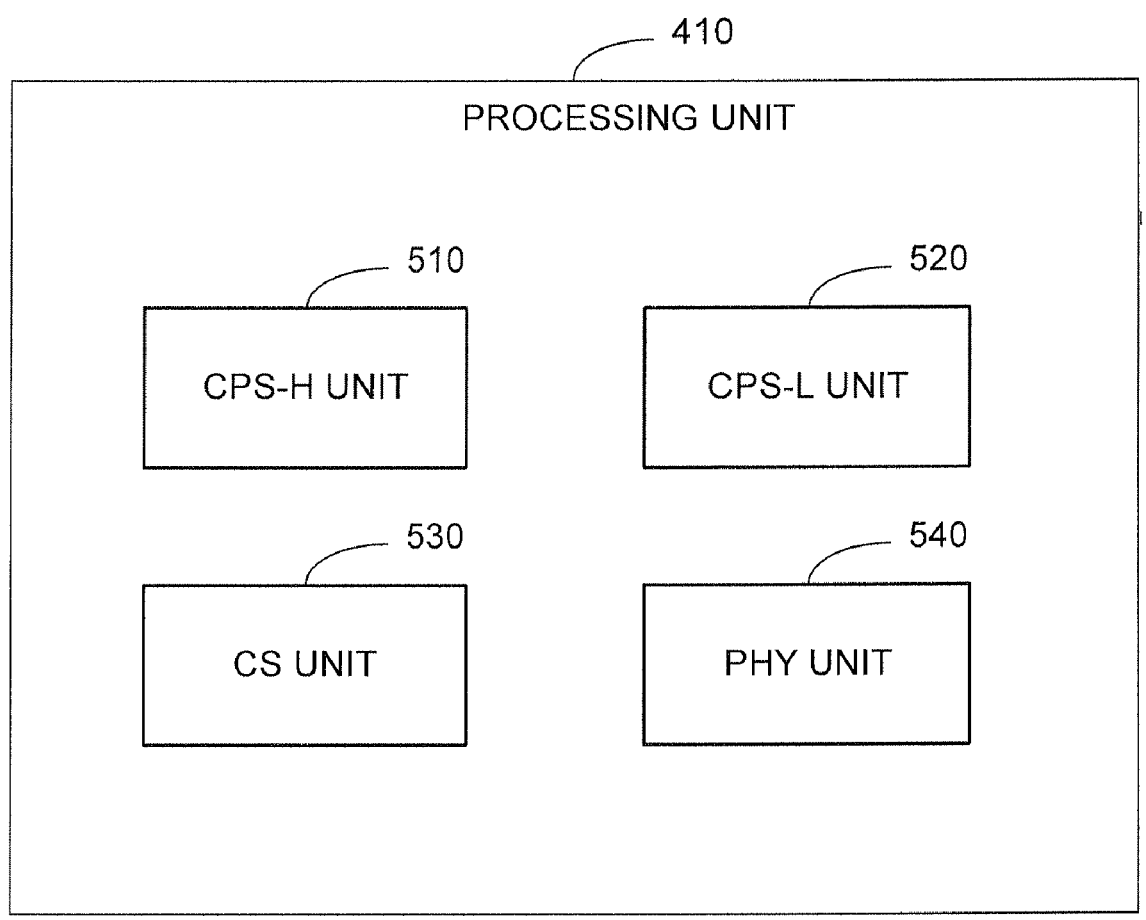
FIG. 5 illustrates an example embodiment of a processing unit of the base station, access service network gate way, the mobile station arranged to implement the radio protocol architecture of FIG. 3.

The functions of the radio protocol architecture can be carried out by an example embodiment of the processing unit 410 as illustrated in FIG. 5. In this embodiment, the processing unit 410 includes a CPS-H unit 510, a CPS-L unit 520, a CS unit 530, and a PHY unit 540. These processing units 510-540 are arranged to carry out the functionalities of the corresponding layers of the example radio protocol architecture illustrated in FIG. 3.

The CPS-H unit 510 is arranged to provide the CPS-H sublayer functionalities including the RRC functionalities. These functionalities include system information broadcast; multicast broadcast services (MBS); connection establishment, maintenance, and release; mobility management (inter RAT (radio access technology) measurements and intra RAT measurements; paging; location management (such as initiation of timing advance measurements); power control; and interference management.

The CPS-H unit 510 exchanges control information with a unit implementing a higher protocol layer above the L3 layer (not shown). For brevity, this unit is referred to as the "higher layer unit". In one embodiment, the CPS-H unit 510 converts control information received from the higher layer unit to control information units carrying RRC messages. The converted control information units are provided to the CPS-L unit 520, the CS unit 530, and/or the PHY unit 540 (via appropriate control SAP units described below). The CPS-H unit 510 also performs the reverse operation—that is—converts the control information units received from the processing units 520, 530 and/or 540 to control information in a form appropriate for the higher layer unit.

In one embodiment, CPS-H unit 510 packages the control information into RRC-SDUs with the control information contained therein, and the RRC-SDUs are provided to the CPS-L unit 520, the CS unit 530, and/or the PHY unit 540. Conversely, the CPS-H unit 510 can extract the control information in the RRC-SDUs received from the CPS-L unit 520, the CS unit 530, and/or the PHY unit 540 and provide the extracted control information to the higher layer unit.

On the user data side, the CPS-H unit 510 can convert user data from the higher layer unit to RRC-SDUs containing the corresponding data to be provided to the CPS-L and/or the CS units 520, 530 (via appropriate data SAP units described below) and convert the RRC-SDUs from the CPS-L and/or CS units 520, 530 to user data in a form appropriate for the higher layer unit.

In an embodiment, the higher layer unit may provide the user data in higher layer PDUs. The CPS-H unit 510 can package the higher layer PDUs into the RRC-SDUs to be provided to the CPS-L and/or CS units 520, 530. Conversely, the CPS-H unit 510 can extract the higher layer PDUs from the RRC-SDUs received from the CPS-L and/or CS units 520, 530 to be provided to the higher layer unit.

The CPS-L unit 520 is arranged to provide the RLC and MAC functionalities. These include providing services to the CPS-H, CS, and the PHY units, 510, 530, 540. These include ARQ; PDU segmentation and delivery; PDU packing and unpacking; PDU multiplexing and demultiplexing; PDU fragmenting and defragmenting; and scheduling.

The CPS-L unit 520 can convert the control information units received from the CPS-H unit 510 to MAC PDUs containing the control information and vice versa. The CPS-L unit 520 can also convert control information received from the CS unit 530 to MAC PDUs and vice versa. In one embodiment, the control information from the CS unit 530 is contained within CS-SDUs. The MAC PDUs containing the control information are provided to the PHY unit 540.

On the data side, the CPS-L unit 520 can convert the RRC-SDUs and/or CS-SDUs containing the user data from the CPS-H and/or CS units 510, 530 to MAC PDUs and vice versa.

The CS unit 530 is arranged to perform service specific convergence functions. When user data or control information is received from either the higher layer unit (in the form of higher layer PDUs) or the CPS-H unit 510 (in the form of the RRC-SDUs), the CS unit 530 classifies the higher layer PDUs or the RRC-SDUs, performs processing based on the classification (if necessary), converts the higher layer PDUs or the RRC-SDUs into CS-SDUs (usually by encapsulation), and delivers the CS-SDUs to the CPS-L unit 520 via appropriate control or data SAP units. The CS unit 530 also performs the reverse operations so that the CS-SDUs received from the CPS-L unit 520 are appropriately reconstituted and provided to the higher layer unit and/or the CPS-H unit 510.

The PHY unit 540 is arranged to transfer the MAC PDUs from the CPS-L unit 530 to other nodes and vice versa. For example, the PHY units 540 of the BS 110 and the MS 120 exchange the MAC PDUs (encapsulated according to the PHY layer protocol) with each other over the R1 radio link with assistance from the communication unit 440. The PHY unit 540 can also transfer RRC information to/from the CPS-H unit 510.

Again, the specific implementation of these processing units 510, 520, 530, and 540 can be accomplished in many ways. Each unit may be implemented in software, hardware, firmware, or in any combination in practice. Further, two or more units can be combined into a single integral unit for implementation.

Figure 6:
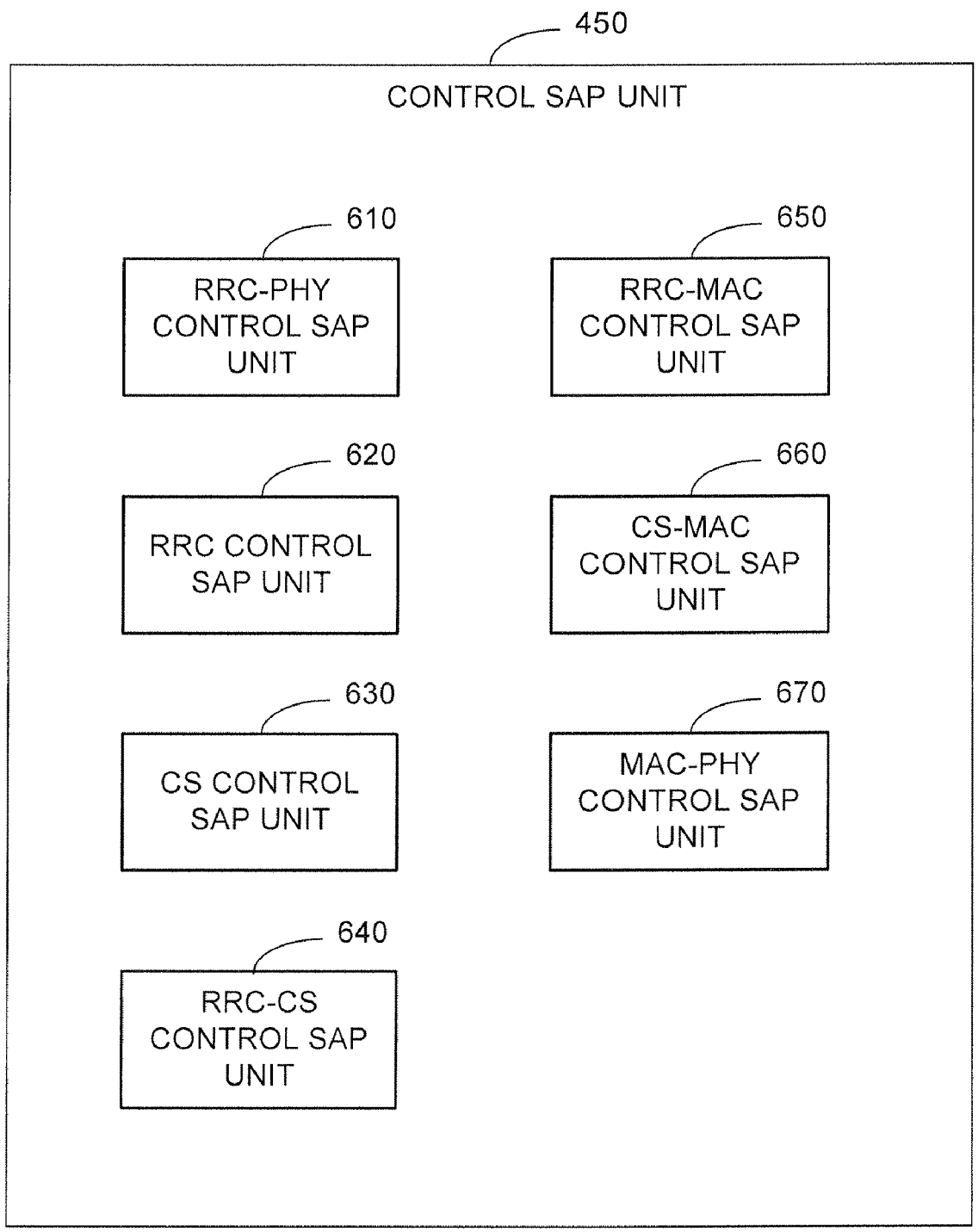
FIG. 6 illustrates an example embodiment of a control service access points unit of the base station, access service network gate way, the mobile station arranged to implement the radio protocol architecture of FIG. 3.

The CPS-H unit 510, CPS-L unit 520, CS unit 530, and the PHY unit 540 can interface with each other through the control and data SAP units 450, 460. FIG. 6 illustrates an embodiment of the control SAP unit 450, which includes a RRC-PHY control SAP unit 610, a RRC control SAP unit 620, a CS control SAP unit 630, a RRC-CS control SAP unit 640, a RRC-MAC control SAP unit 650, a CS-MAC control SAP unit 660, and a MAC-PHY control SAP unit 670. Table 1 provides a summary of mapping between the control SAP units and the processing units using the particular control SAP unit to exchange control information.

TABLE 1

| Control SAP unit | To exchange control information between | |
|---|---|---|
| RRC-PHY control SAP unit 610 | CPS-H unit 510 | PHY unit 540 |
| RRC control SAP unit 620 | CPS-H unit 510 | higher layer unit |
| CS control SAP unit 630 | CS unit 530 | higher layer unit |
| RRC-CS control SAP unit 640 | CPS-H unit 510 | CS unit 530 |
| RRC-MAC control SAP unit 650 | CPS-H unit 510 | CPS-L unit 520 |
| CS-MAC control SAP unit 660 | CS unit 530 | CPS-L unit 520 |
| MAC-PHY control SAP unit 670 | CPS-L unit 520 | PHY unit 540 |

According to the Table 1, for example, the RRC-PHY control SAP unit 610 is used by the CPS-H unit 510 and the PHY unit 540 to exchange RRC control information with each other such as measurement information related to the R1 link between the BS 110 and the MS 120. These include signal strength, signal-to-noise ratio (SNR), RSSI, timing advance, and interference measurement, among others.

Figure 7:
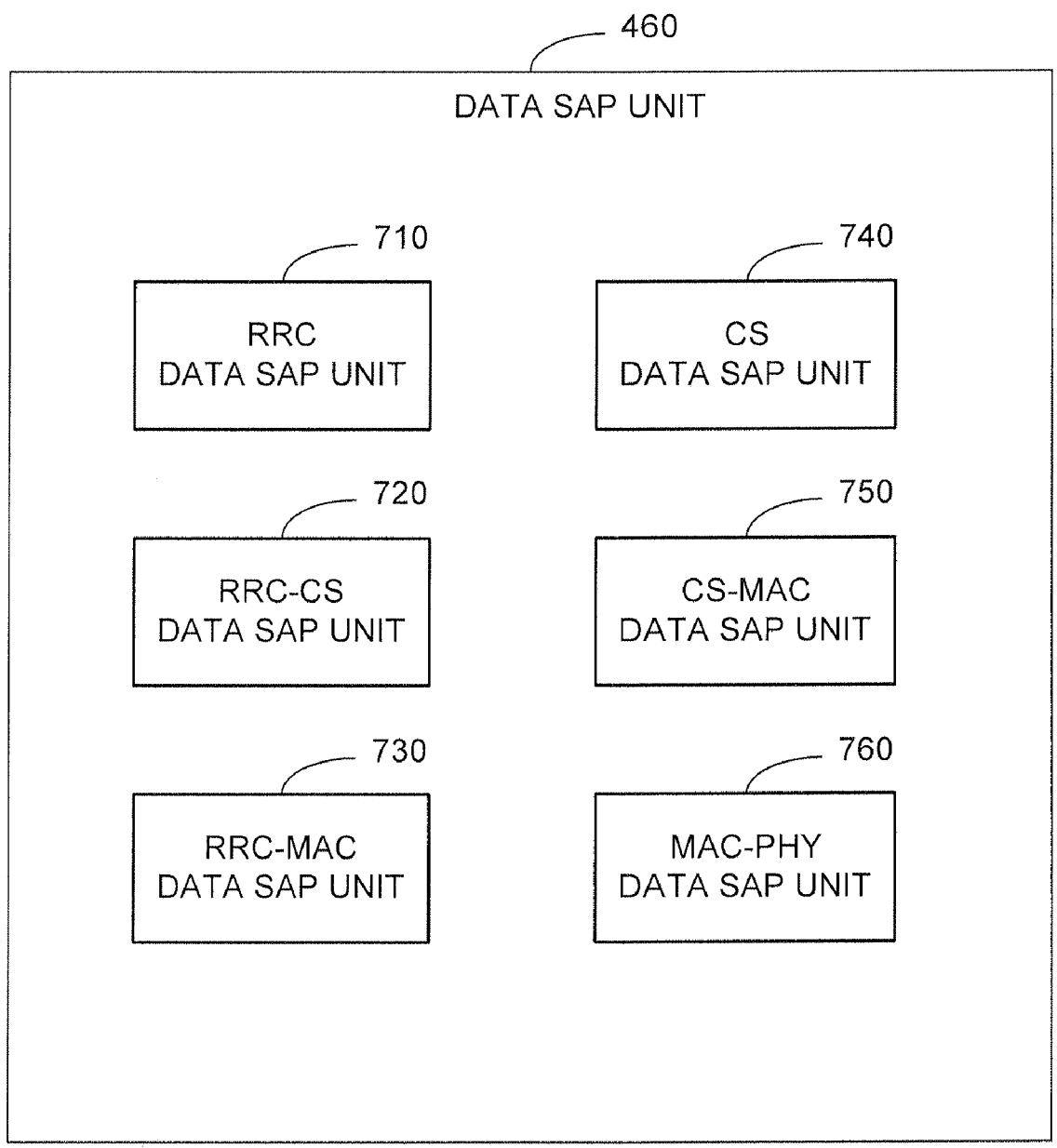
FIG. 7 illustrates an example embodiment of a data service access points unit of the base station, access service network gate way, the mobile station arranged to implement the radio protocol architecture of FIG. 3.

FIG. 7 illustrates an embodiment of the data SAP unit 460, which includes a RRC data SAP unit 710, a RRC-CS data SAP unit 720, a RRC-MAC data SAP unit 730, a CS data SAP unit 740, a CS-MAC data SAP unit 750, and a MAC-PHY data SAP unit 760. Table 2 provides a summary of mapping between the data SAP units and the processing units using the particular data SAP unit to exchange data.

TABLE 2

| Control SAP unit | To exchange data between | |
|---|---|---|
| RRC data SAP unit 710 | CPS-H unit 510 | higher layer unit |
| RRC-CS data SAP unit 720 | CPS-H unit 510 | CS unit 530 |
| RRC-MAC data SAP unit 730 | CPS-H unit 510 | CPS-L unit 520 |
| CS data SAP unit 740 | CS unit 530 | higher layer unit |
| CS-MAC data SAP unit 750 | CS unit 530 | CPS-L unit 520 |

TABLE 2-continued

| Control SAP unit | To exchange data between | |
| --- | --- | --- |
| MAC-PHY data SAP unit 760 | CPS-L unit 520 | PHY unit 540 |

Referring back to FIG. 4A, when the node is the BS 110 or the ASN 130, the node may also include the CIB unit 420 and/or the MIB unit 430. This mirrors the separation of the management plane from the control plane in the example radio protocol architecture of FIG. 3, and therefore, the CIB and the MIB are also separated. The control plane is associated with radio control functionalities and the management plane is associated with network management functionalities.

The CIB unit 420 is arranged to maintain the control plane related information in the CIB. These include signaling information of connections between the BS 110 and the MS 120, the MS state, the BS state, MS mobility, and so on.

The MIB unit 430 is arranged to maintain the management plane related information in the MIB. These include node installation, network configuration, network resource monitoring, network alarms, and long-term subscriber information (such as MS subscription details), among others. Note that the MIB is part of the NMS that can be implemented in the BS 110 or as a separate unit outside the BS 110.

The data plane, which is associated with data transport functionalities, is also separate from the control and the management planes.

Figure 8:
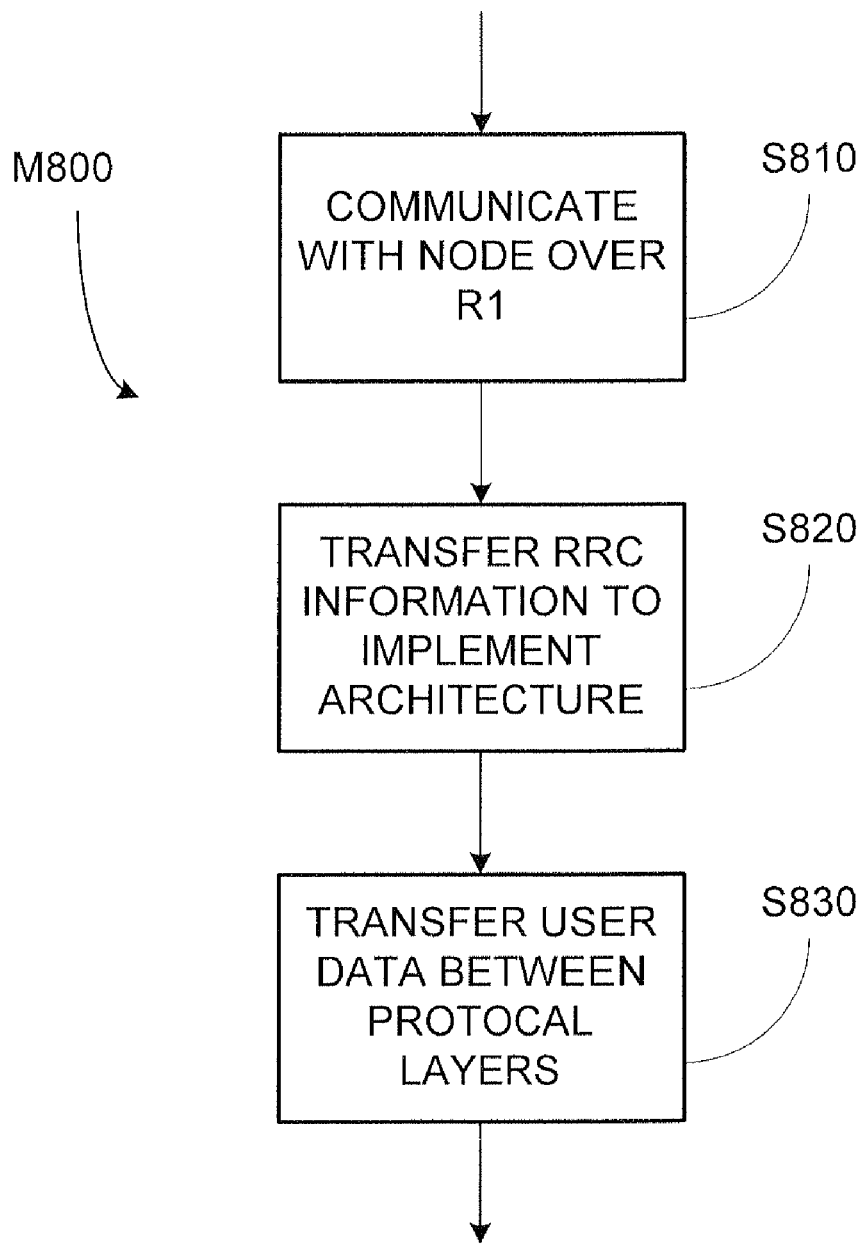
FIG. 8 illustrates a flow chart of an example method to operate a node of a wireless network to implement the radio protocol architecture of FIG. 3.

FIG. 8 illustrates a flow chart of an example method (M800) to operate a node, such as the BS 110 or the MS 120, of wireless network to implement the radio protocol architecture. In step S810, the node communicates with a second node over the R1 link to exchange data and control information including RRC information. In step S820, the node transfers control information to implement the radio protocol architecture. The control information are exchanged with the second node and are also exchanged between the units 410-460 of the node that implement the layers of the architecture including the PHY, MAC, and the RRC sublayers. Similarly, in step S830, the user data are exchanged with the second node and also between the units 410-460 of the node.

The step S820 of transferring the control information can include providing the RRC functionalities using the CPS-H unit 510. The RRC functionalities can include any one or more of system information broadcast, MBS, connection establishment and maintenance and release, radio resource management, inter RAT measurements, intra RAT measurements, paging, location based management, power control, and interference management.

Figure 9:
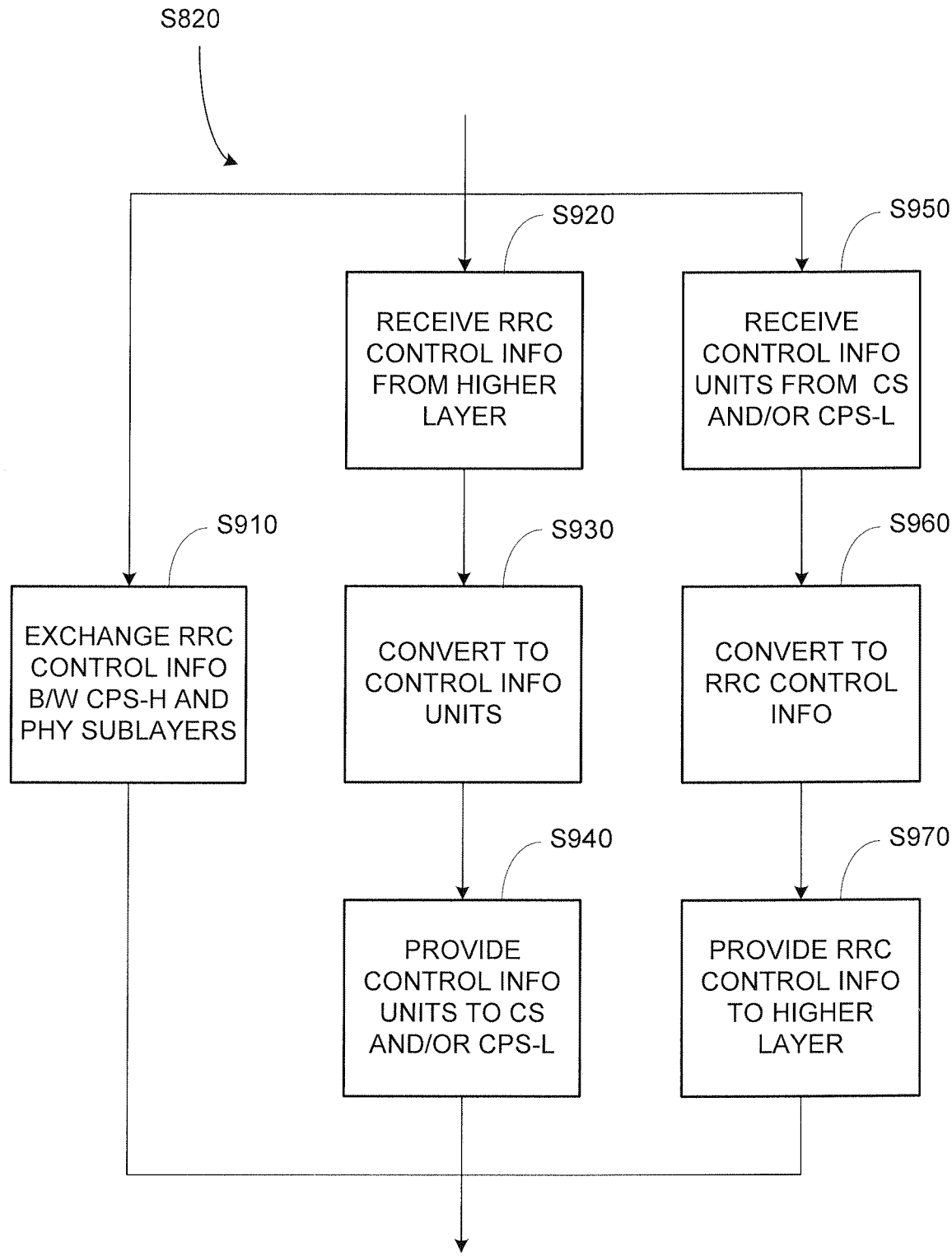
FIG. 9 illustrates a flow chart of an example process to implement the MAC CPS-H sublayer of the radio protocol architecture for flow of control information.

FIG. 9 illustrates an example process to perform the step S820 using the CPS-H unit 510. Recall that the CPS-H unit 510 can directly interface with the PHY unit 540 to exchange the RRC control information through the RRC-PHY control SAP. This is illustrated in step 910.

The CPS-H unit 510 may also receive control information from the higher layer unit through the RRC control SAP and convert the received control information into control information units, which can then be provided to either the CS unit 530 (through the RRC-CS control SAP) or to the CPS-L unit 520 (through the RRC-MAC control SAP). These correspond to steps S920, S930, and S940.

The reverse can occur. That is, the CPS-H unit 510 can receive the control information units from the CS unit 530 (through the RRC-CS control SAP) or from the CPS-L unit 520 (through the RRC-MAC control SAP). The information contained therein are converted to the control information and are provided to the higher layer unit through the RRC control SAP. These correspond to steps S950, S960, and S970.

Figure 10:
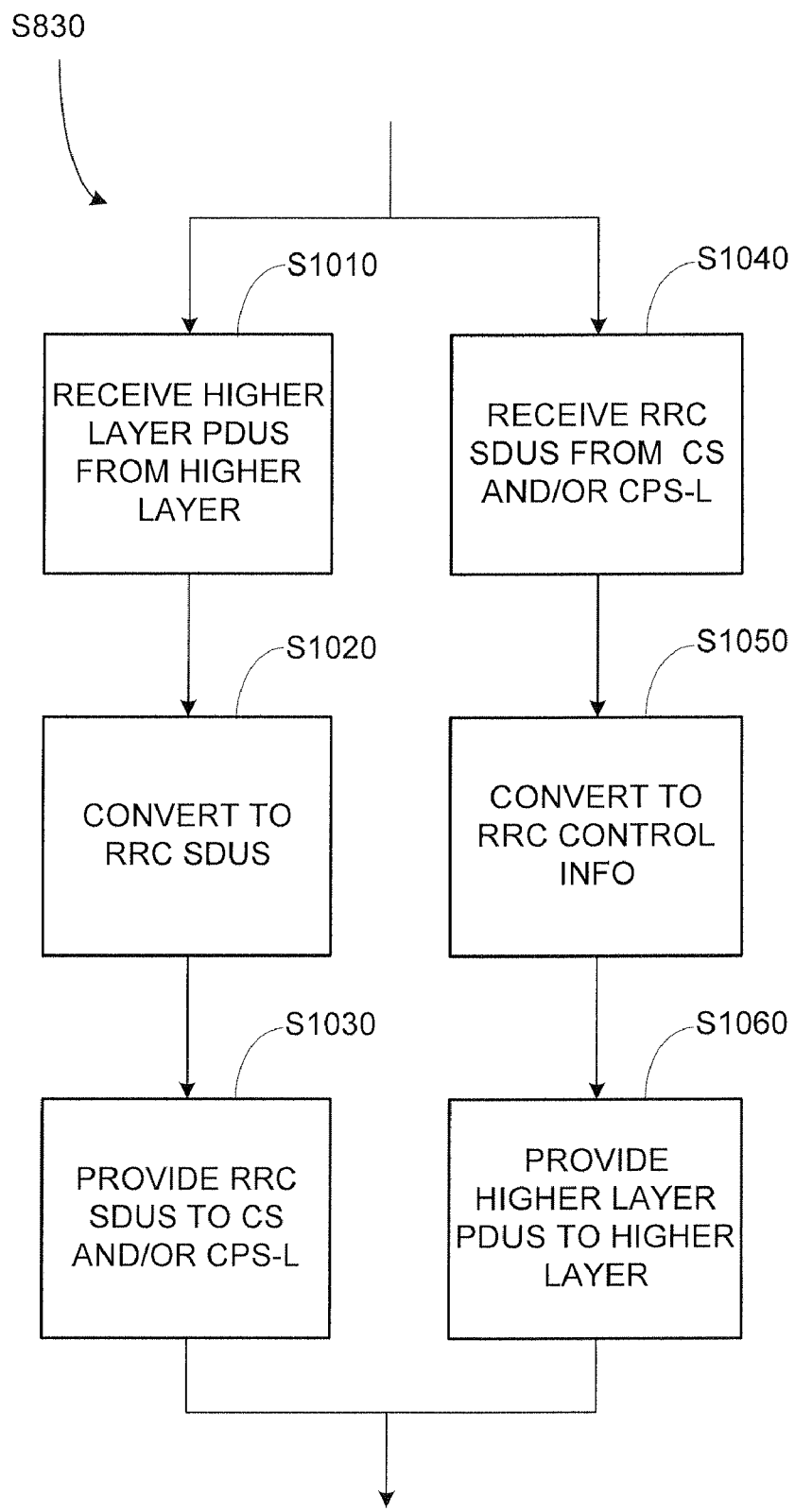
FIG. 10 illustrates a flow chart of an example process to implement the MAC CPS-H sublayer of the radio protocol architecture for flow of data.

On the data transfer side, FIG. 10 illustrates an example process to perform the step S830 using the CPS-H unit 510. On the downstream data transfer, in step S1010, the CPS-H unit 510 receives higher layer PDUs from the higher layer unit through the RRC data SAP and converts the higher layer PDUs into RRC SDUs containing the corresponding user data in step S1020. In step S1030, the RRC SDUs are provided to either the CS unit 530 (through the RRC-CS data SAP) or to the CPS-L unit 520 (through the RRC-MAC data SAP).

The reverse occurs on the upstream user data transfer. In step S1040, the CPS-H unit 510 receives the RRC SDUs containing the user data from the CS unit 530 (through the RRC-CS data SAP) or from the CPS-L unit 520 (through the RRC-MAC data SAP). In step S1050, the RRC SDUs are converted to the higher layer PDUs, and are provided to the higher layer unit through the RRC data SAP in step S1060.

The step S820 of transferring the control information can include providing the RLC and MAC functionalities using the CPS-L unit 520. These functionalities can include ARQ, PDU segmentation and delivery, PDU packing and unpacking, PDU multiplexing and demultiplexing, PDU fragmenting and defragmenting, and scheduling.

Figure 11:
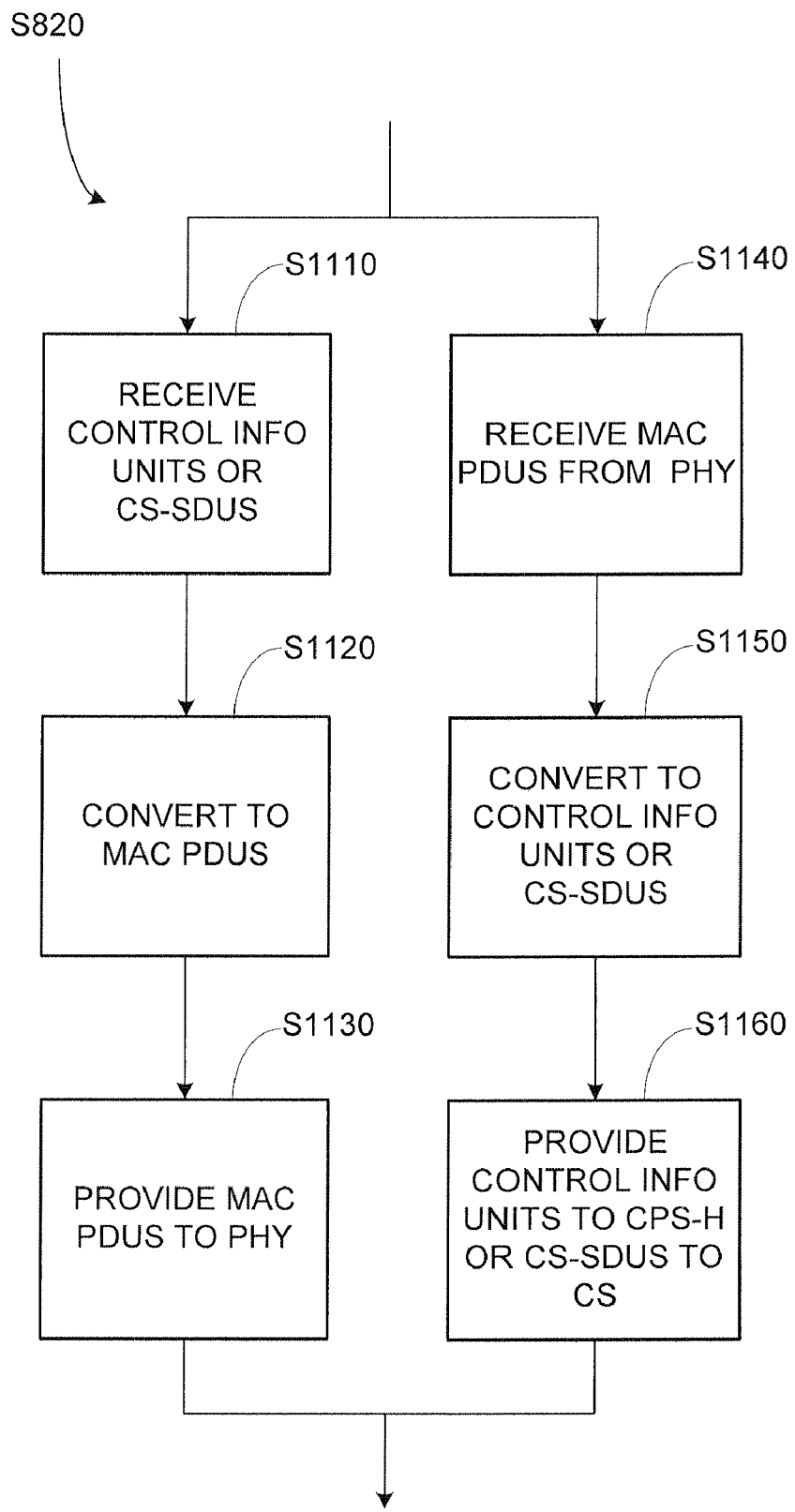
FIG. 11 illustrates a flow chart of an example process to implement the MAC CPS-L sublayer of the radio protocol architecture for flow of control information.

FIG. 11 illustrates an example process to perform the step S820 using the CPS-L unit 520. On the downstream flow of the control information, the CPS-L unit 520 receives the control information units from the CPS-H unit 510 (through the RRC-MAC control SAP) or CS-SDUs containing the control information from the CS unit 530 (through the CS-MAC control SAP) in step S1110. In step S1120, the control information units or the CS-SDUs are converted into MAC PDUs containing corresponding control information. The MAC PDUs are provided to the PHY unit 540 in step S1130 through the MAC-PHY control SAP.

On the upstream control flow, in step S1140, the CPS-L unit 520 receives, through the MAC-PHY control SAP, the MAC PDUs from the PHY unit 540. The MAC PDUs are converted into either the control information units or CS-SDUs in step S1150, and are provided accordingly to either the CPS-H unit 510 (through the RRC-MAC control SAP) or to the CS unit 530 (through the CS-MAC control SAP).

Figure 12:
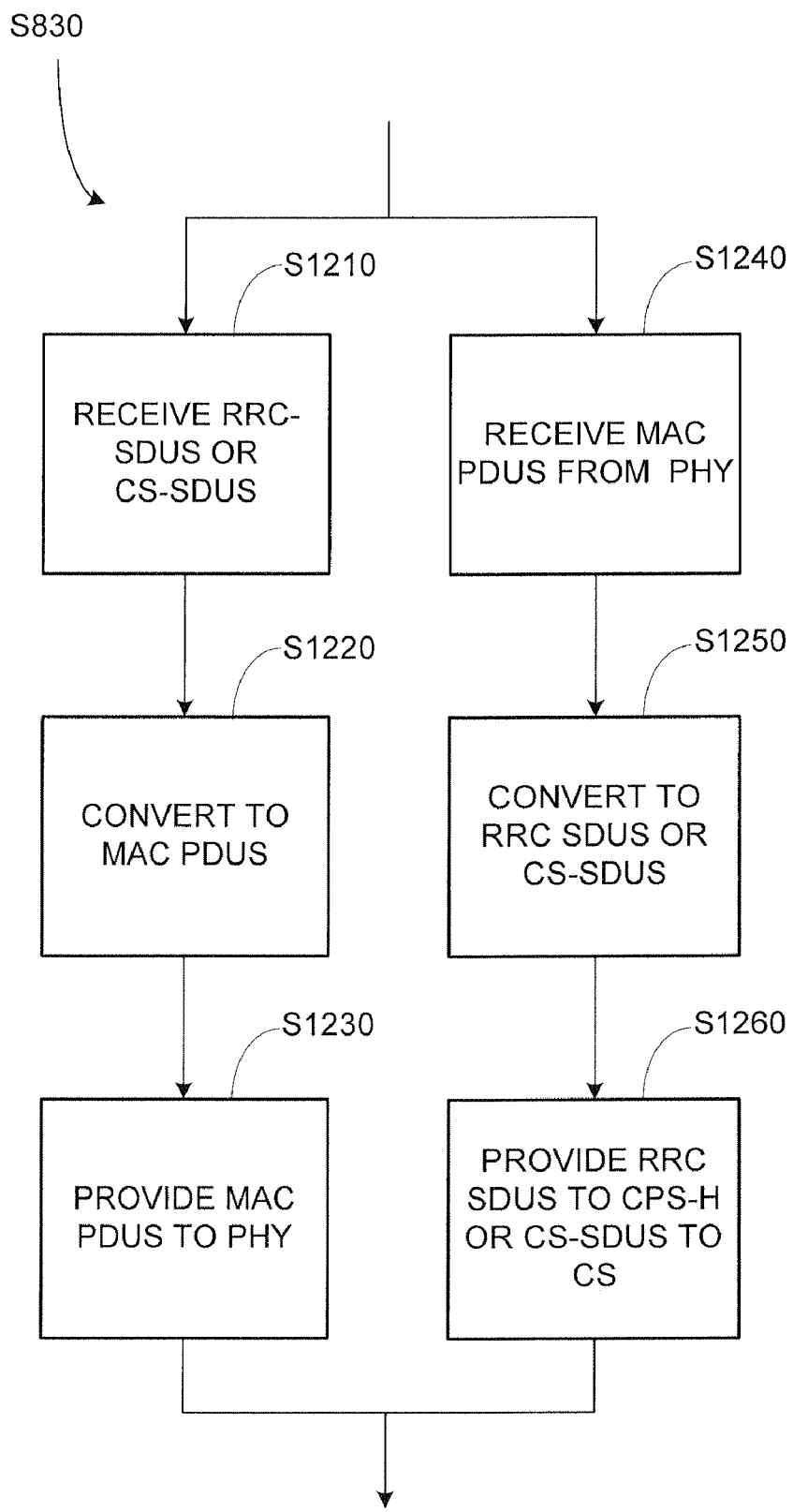
FIG. 12 illustrates a flow chart of an example process to implement the MAC CPS-L sublayer of the radio protocol architecture for flow of data.

FIG. 12 illustrates an example process to perform the step S830 using the CPS-L unit 520. On the downstream flow of the data, the CPS-L unit 520 receives the RRC SDUs from the CPS-H unit 510 (through the RRC-MAC data SAP) or CS-SDUs containing the user data from the CS unit 530 (through the CS-MAC data SAP) in step S1210. In step S1220, the received information are converted into MAC PDUs containing the user data. The MAC PDUs are provided to the PHY unit 540 in step S1230 through the MAC-PHY data SAP.

On the upstream flow, in step S1240, the CPS-L unit 520 receives, through the MAC-PHY data SAP, the MAC PDUs from the PHY unit 540. The MAC PDUs are converted into either the RRC SDUs or CS-SDUs in step S1250, and are provided accordingly to either the CPS-H unit 510 (through the RRC-MAC data SAP) or to the CS unit 530 (through the CS-MAC data SAP).

The step S820 of transferring the RRC information can include providing service specific convergence functionalities using the CS unit 530. These can include transforming and mapping higher layer PDUs from the higher layer unit, classifying and associating the higher layer PDUs to service flow identifiers (SFID) and to connection identifiers (CID), convert the higher layer PDUs into CS-SDUs, and provide payload header suppression/compression (PHS) services.

Figure 13:
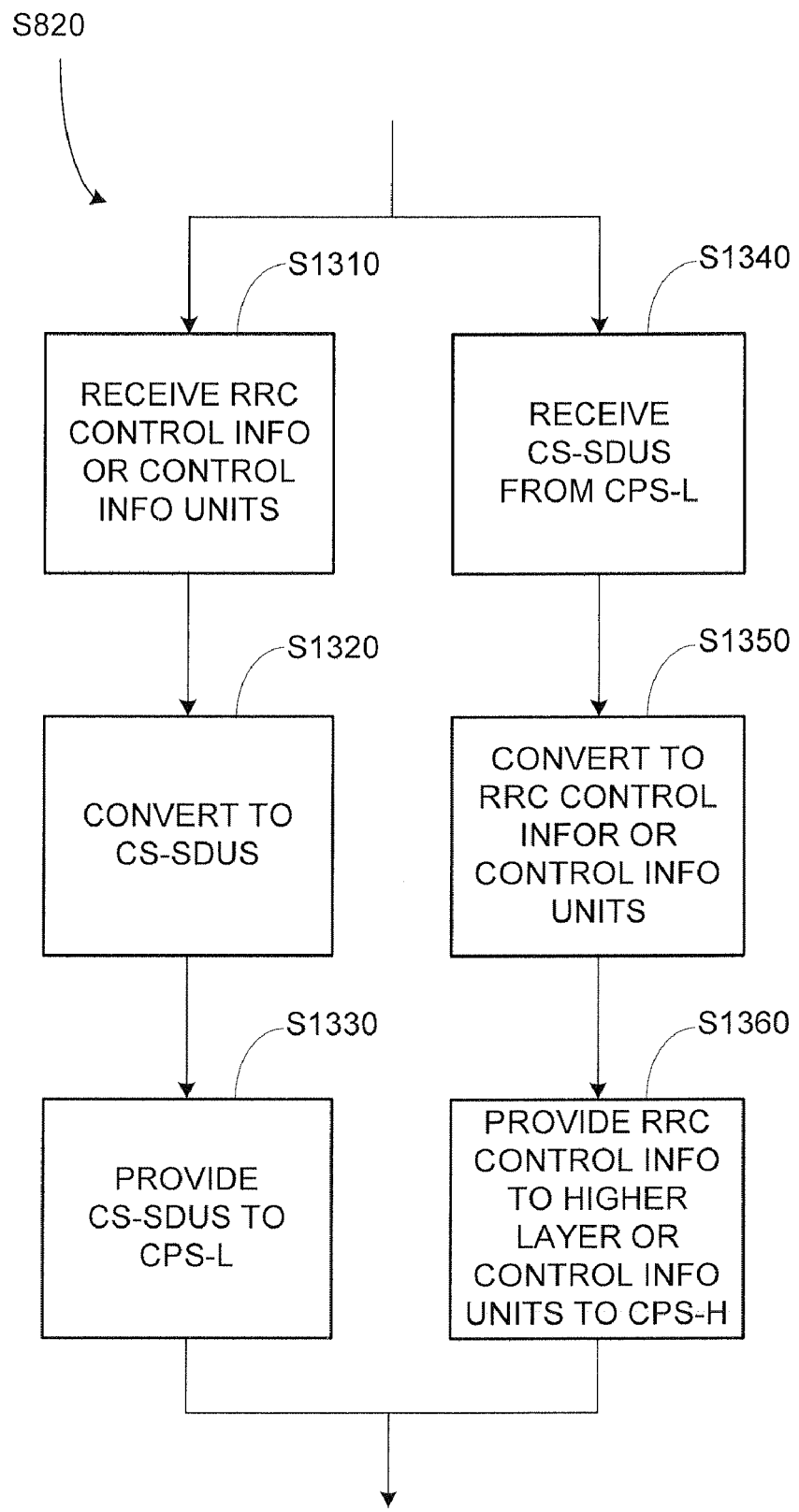
FIG. 13 illustrates a flow chart of an example process to implement the CS sublayer of the radio protocol architecture for flow of control information.

FIG. 13 illustrates an example process to perform the step S820 using the CS unit 530. On the downstream control information flow, in step S1310, the CS unit 530 receives (through the CS control SAP) control information from the higher layer unit or receives (through the RRC-CS control SAP) the control information units from a CPS-H unit 510. In step S1320, the received control information units are converted into CS-SDUs containing the corresponding control information. In step S1330, the CS unit 530 provides the CS SDUs to the CPS-L unit 520 through the CS-MAC control SAP.

On the upstream control information flow, in step S1340, the CS unit 530 receives, through the CS-MAC control SAP, the CS-SDUs from the CPS-L unit 520. In step S1350, the CS-SDUs are converted to the RRC control information or to the control information unit. In step S1360, the control information are provided to the higher layer unit (through the CS control SAP) or the control information units are provided to the CPS-H unit 510 (through the RRC-CS control SAP).

Figure 14:
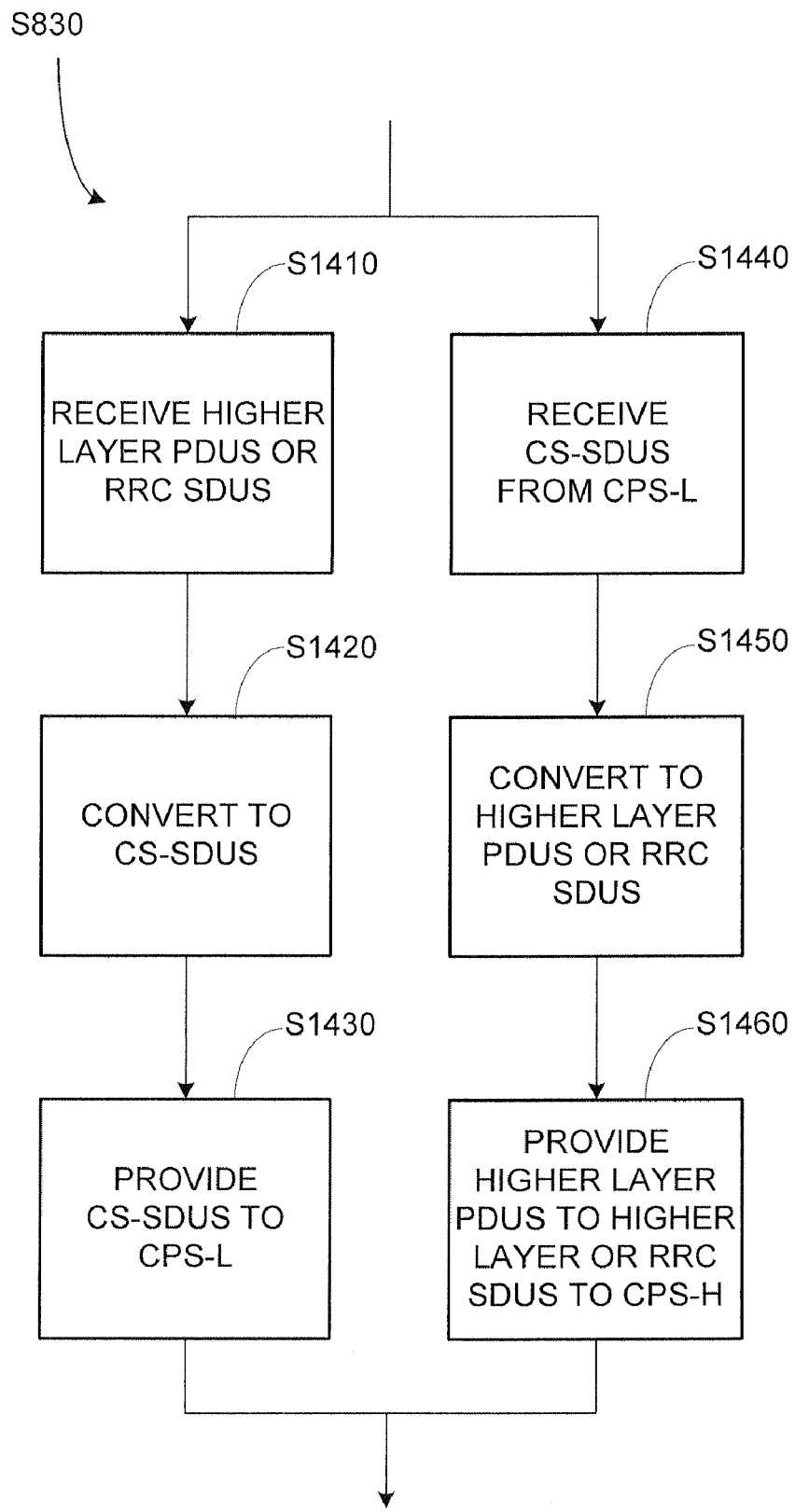
FIG. 14 illustrates a flow chart of an example process to implement the CS sublayer of the radio protocol architecture for flow of data.

FIG. 14 illustrates an example process to perform the step S830 using the CS unit 530. On the downstream data flow, in step S1410, the CS unit 530 receives (through the CS data SAP) higher layer PDUs from the higher layer unit or receives (through the RRC-CS data SAP) the RRC SDUs from a CPS-H unit 510. In step S1420, the received data are converted into CS-SDUs containing the corresponding data. In step S1430, the CS unit 530 provides the CS SDUs to the CPS-L unit 520 through the CS-MAC data SAP.

On the upstream data flow, in step S1440, the CS unit 530 receives, through the CS-MAC data SAP, the CS-SDUs containing data from the CPS-L unit 520. In step S1450, the CS-SDUs are converted to the higher layer PDUs or to the RRC SDUs. In step S1460, the higher layer PDUs are provided to the higher layer unit (through the CS data SAP) or the RRC SDUs are provided to the CPS-H unit 510 (through the RRC-CS data SAP).

Figure 15:
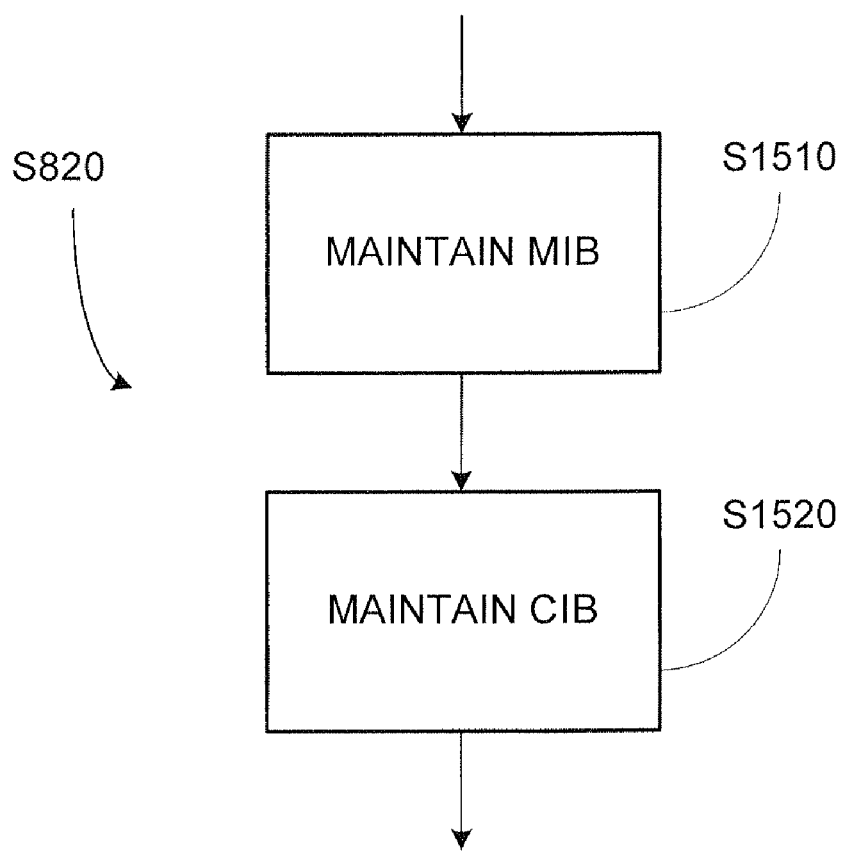
FIG. 15 illustrates a flow chart of an example process to maintain management and control information.

FIG. 15 illustrates an example process to perform step S820 related to separation of management and control planes. In step S1510, the management plane related information are maintained in the MIB. These can include network node installation, network configuration, network resource monitoring, and network alarms, and MS subscription information. In step S1520, control plane related information are maintained in the CIB. These can include radio control signaling information related the radio link between the BS 110 and the MS 120 such as signal strength, modulation, signal-to-noise ratio, BS state, MS state, and MS mobility.

As mentioned, it is preferred that the MIB and the CIB be separate. Also, MIB may be maintained externally from the BS 110.

A non-exhaustive list of advantages of one or more embodiments includes, among others:

Simplicity.

Cost reduction from future upgrade and evolution.

Ease of implementation, operation, evolution, migration, and maintenance.

Efficient maintenance management and radio management.

Ease of deployment when considering the ASN A, B, C profile.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A node of a wireless network, comprising:
   a communication unit arranged to communicate with a second node over a radio link;
   a control SAP unit arranged to transfer radio resource control (RRC) information to implement protocol layers of a radio protocol architecture between units of the node that implement layer 1 (L1), layer 2 (L2), and layer 3 (L3) functions of the radio protocol architecture; and
   a data SAP unit arranged to transfer user data between the units of the node that implement the L1, L2, and L3 layer functions of the radio protocol architecture; and
   a processing unit arranged to control operations of the node to implement the protocol layers of the radio protocol architecture,
   wherein the radio protocol architecture comprises:
      a convergence sublayer (CS) to provide service specific convergence functions to convert the user data received from a transport protocol layer above the L3 layer into service data units (SDU) and vice versa;
      a MAC common part sublayer-high (CPS-H) to provide radio resource control (RRC) functionalities;
      a MAC common part sublayer-low (CPS-L) to provide radio link control (RLC) and MAC functionalities including converting the SDUs from the CS sublayer and control information units carrying control (RRC) messages from the CPS-H sublayer to MAC protocol data units (PDUs) and vice versa; and
      a PHY layer to transfer the MAC PDUs from the CPS-L sublayer over the radio links to the second node and vice versa.

2. The node of claim 1, wherein the node and the second node are respectively a base station (BS) and a mobile station (MS) or are respectively the MS and the BS.

3. The node of claim 1, wherein the L3 is a RRC layer, L1 is a PHY layer, and L2 is a MAC layer.

4. The node of claim 1,
   wherein the processing unit comprises a CPS-H unit arranged to implement the CPS-H sublayer of the radio protocol architecture, and
   wherein the RRC functionalities provided by the CPS-H unit include one or more of system information broadcast, multicast broadcast services (MBS), connection establishment and maintenance and release, radio resource management, inter radio access technology (RAT) measurements, intra RAT measurements, paging, location based management, power control, and interference management.

5. The node of claim 4,
   wherein the processing unit comprises a PHY unit arranged to implement the PHY layer of the radio protocol architecture including:
      receiving the MAC PDUs from a CPS-L unit arranged to implement the CPS-L sublayer of the radio protocol architecture, transferring the MAC PDUs to the second node over the radio link,
receiving the MAC PDUs from the second node over the radio link, and
providing the received MAC PDUs to the CPS-L unit, and
wherein the CPS-H unit and the PHY unit are arranged to exchange the RRC control information related to the radio link between the node and the second node including signal strength, signal-to-noise ratio (SNR), RSSI, timing advance, and interference level.

6. The node of claim 5, wherein the control SAP unit includes a RRC-PHY control SAP unit arranged to operate as a control SAP to enable exchange of the RRC control information between the CPS-H unit and the PHY unit.

7. The node of claim 5,
wherein the processing unit comprises:
the CPS-L unit arranged to implement the CPS-L sublayer of the radio protocol architecture including providing the RLC and MAC functionalities; and
a CS unit arranged to implement the CS sublayer of the radio protocol architecture, and
wherein the CPS-H unit is arranged to:
convert the RRC control information from a higher layer unit arranged to implement a protocol layer above the L3 layer into control information units to be provided to the CS unit, the CPS-L unit, or the PHY unit, and
convert the control information units from the CS unit, the CPS-L unit, or the PHY unit into the RRC control information to be provided to the higher layer unit.

8. The node of claim 7, wherein the control SAP unit comprises:
a RRC control SAP unit arranged to operate as a control SAP to enable exchange of the RRC control information between the CPS-H unit and the higher layer unit;
a RRC-MAC control SAP unit arranged to operate as a control SAP to enable exchange of control information units between the CPS-H unit and the CPS-L unit; and
a RRC-CS control SAP unit arranged to operate as a control SAP to enable exchange of control information units between the CPS-H unit and the CS unit.

9. The node of claim 7,
wherein the data SAP unit comprises:
a RRC data SAP unit arranged to operate as a data SAP to enable exchange of higher layer PDUs between the CPS-H unit and the higher layer unit;
a RRC-MAC data SAP unit arranged to operate as a data SAP to enable exchange of RRC-SDUs between the CPS-H unit and the CPS-L unit; and
a RRC-CS data SAP unit arranged to operate as a data SAP to enable exchange of the RRC-SDUs between the CPS-H unit and the CS unit, and
wherein the CPS-H unit is arranged to:
convert the higher layer PDUs containing user data received from the higher layer unit through the RRC data SAP unit into RRC-SDUs,
provide the RRC-SDUs to the CPS-L unit through the RRC-MAC data SAP unit or to the CS unit through the RRC-CS data SAP unit,
receive the RRC-SDUs from the CPS-L unit through the RRC-MAC data SAP unit or from the CS unit through the RRC-CS data SAP unit,
convert the received RRC-SDUs into the higher layer PDUs, and
provide the higher layer PDU to the higher layer unit through the RRC data SAP unit.

10. The node of claim 7, wherein the RLC and MAC functionalities provided by the CPS-L unit include one or more of ARQ, PDU segmentation and delivery, PDU packing and unpacking, PDU multiplexing and demultiplexing, PDU fragmenting and defragmenting, and scheduling.

11. The node of claim 10,
wherein the control SAP unit comprises:
a RRC-MAC control SAP unit arranged to operate as a control SAP to enable exchange of control information units between the CPS-L unit and the CPS-H unit;
a CS-MAC control SAP unit arranged to operate as a control SAP to enable exchange of CS-SDUs containing the control information between the CPS-L unit and the CS unit; and
a MAC-PHY control SAP unit arranged to operate as a control SAP to enable exchange of MAC PDUs containing the control information between the CPS-L unit and the PHY unit, and
wherein the CPS-L unit is arranged to:
receive the control information units from the CPS-H unit through the RRC-MAC control SAP unit or receive the CS-SDUs containing the control information from the CS unit through the CS-MAC control SAP unit,
convert the received control information units or the CS-SDUs containing the control information into the MAC PDUs containing corresponding control information,
provide the MAC PDUs containing the control information to the PHY unit through the MAC-PHY control SAP unit,
receive the MAC PDUs containing the control information from the PHY unit through the MAC-PHY control SAP unit,
convert the received MAC PDUs containing the control information into the control information units or into the CS-SDU containing the control information, and
provide the converted control information units to the CPS-H unit through the RRC-MAC control SAP unit or the converted CS-SDUs containing the control information to the CS unit through the CS-MAC control SAP unit.

12. The node of claim 10,
wherein the data SAP unit comprises:
a RRC-MAC data SAP unit arranged to operate as a data SAP to enable exchange of the RRC-SDUs between the CPS-L unit and the CPS-H unit;
a CS-MAC data SAP unit arranged to operate as a data SAP to enable exchange of the CS-SDUs containing the user data between the CPS-L unit and the CS unit; and
a MAC-PHY data SAP unit arranged to operate as a data SAP to enable exchange of the MAC PDUs containing the user between the CPS-L unit and the PHY unit, and
wherein the CPS-L unit is arranged to:
receive RRC-SDUs from the CPS-H unit through the RRC-MAC data SAP unit or receive the CS-SDUs containing the user data from the CS unit through the CS-MAC data SAP unit,
convert the received RRC-SDUs or the CS-SDUs containing the user data into the MAC PDUs containing the user data,
provide the MAC PDUs containing the user data to the PHY unit through the MAC-PHY data SAP unit, receive the MAC PDUs containing the user data from the PHY unit through the MAC-PHY data SAP unit, convert the received MAC PDUs containing the user data into the RRC-SDUs or into the CS-SDU containing the user data, and provide the converted RRC-SDUs to the CPS-H unit through the RRC-MAC data SAP unit or the converted CS-SDUs containing the user data to the CS unit through the CS-MAC data SAP unit.

13. The node of claim 7, wherein the service specific convergence functionalities provided by the CS unit include one or more of transforming and mapping higher layer PDUs from the higher layer unit, classifying and associating the higher layer PDUs to service flow identifiers (SFID) and to connection identifiers (CID), convert the higher layer PDUs into CS-SDUs, and provide payload header suppression/compression (PHS) services.

14. The node of claim 13, wherein the control SAP unit comprises:

a CS control SAP unit arranged to operate as a control SAP to enable exchange of control information between the CS unit and the higher layer unit;

a RRC-CS control SAP unit arranged to operate as a control SAP to enable exchange of control information units between the CPS-H unit and the CS unit; and a CS-MAC control SAP unit arranged to operate as a control SAP to enable exchange of CS-SDUs containing the control information between the CPS-L unit and the CS unit, and wherein the CS unit is arranged to:

receive the control information units from the CPS-H unit through the RRC-CS control SAP unit or receive the control information from the higher layer unit through the CS control SAP unit, convert the control information from the higher layer unit or the control information units from the CPS-H unit into the CS-SDUs containing corresponding control information, provide the CS-SDUs containing the control information to the CPS-L unit through the CS-MAC control SAP unit, receive the CS-SDUs containing the control information from the CPS-L unit through the CS-MAC control SAP unit, convert the CS-SDUs containing the control information to the control information or to the control information units, and provide the control information units to the CPS-H unit through the RRC-CS control SAP unit or provide the control information to the higher layer unit through the CS control SAP unit.

15. The node of claim 13, wherein the data SAP unit comprises:

a CS data SAP unit arranged to operate as a data SAP to enable exchange of higher layer PDUs between the CS unit and the higher layer unit;

a RRC-CS data SAP unit arranged to operate as a data SAP to enable exchange of RRC-SDUs between the CPS-H unit and the CS unit; and a CS-MAC data SAP unit arranged to operate as a data SAP to enable exchange of CS-SDUs containing the user data between the CPS-L unit and the CS unit, and wherein the CS unit is arranged to:

receive the RRC-SDUs from the CPS-H unit through the RRC-CS data SAP unit or receive the higher layer PDUs from the higher layer unit through the CS data SAP unit, convert the higher layer PDUs or the RRC-SDUs into the CS-SDUs containing corresponding user data, provide the CS-SDUs containing the user data to the CPS-L unit through the CS-MAC data SAP unit, receive the CS-SDUs containing the user data from the CPS-L unit through the CS-MAC data SAP unit, convert the CS-SDUs containing the user data to the higher layer PDUs or to the RRC-SDUs, and provide the RRC-SDUs to the CPS-H unit through the RRC-CS data SAP unit or provide the higher layer PDUs to the higher layer unit through the CS data SAP unit.

16. The node of claim 1, wherein the WMAN architecture is orthogonally divided into a management plane, a control plane separate from the management plane, and a user plane separate from the management and the control planes, the management plane is associated with network management functionalities, the control plane is associated with radio control functionalities, the data plane is associated with data transport functionalities, the node is a BS and the second node is a MS, and the BS comprises:

a management information base (MIB) unit; and a control information base (CIB) unit, wherein the MIB unit is arranged to maintain the management plane related information in a MIB and the CIB unit is arranged maintain the control plane related information in a CIB, the CIB being separate from the MIB.

17. The BS of claim 16, wherein the control plane related information in the CIB maintained by the CIB unit comprises radio control signaling information related the radio link between the BS and the MS including one or more of signal strength, modulation, signal-to-noise ratio, BS state, MS state, and MS mobility, and wherein the management plane related information maintained by the MIB unit includes any one or more of network node installation, network configuration, network resource monitoring, and network alarms, and MS subscription information.

18. The BS of claim 17, wherein the MIB unit exists external to the BS and the BS is arranged to access the external MIB unit.

19. A method of operating a node of a wireless network, comprising:

communicating with a second node over a radio link;

transferring radio resource control (RRC) information to implement protocol layers of the radio protocol architecture between units of the node that implement a PHY layer (L1), a MAC layer (L2), and a RRC layer (L3) functions of a radio protocol architecture; and transferring user data between the units of the node that implement the L1, L2, and L3 functions of the radio protocol architecture, wherein the radio protocol architecture comprises:

a convergence sublayer (CS) to provide service specific convergence functions to convert the user data received from a transport protocol layer above the L3 layer into service data units (SDU) and vice versa;

a MAC common part sublayer-high (CPS-H) to provide radio resource control (RRC) functionalities;

a MAC common part sublayer-low (CPS-L) to provide radio link control (RLC) and MAC functionalities including converting the SDUs from the CS sublayer and control information units carrying control (RRC) messages from the CPS-H sublayer to MAC protocol data units (PDUs) and vice versa; and a PHY layer to transfer the MAC PDUs from the CPS-L sublayer over the radio links to the second node and vice versa.

20. The method of claim 19, wherein the step of transferring the RRC information comprises providing RRC functionalities using a CPS-H unit arranged to implement the CPS-H sublayer, and wherein the RRC functionalities include one or more of system information broadcast, multi broadcast services (MBS), connection establishment and maintenance and release, radio resource management, inter radio access technology (RAT) measurements, intra RAT measurements, paging, location based management, power control, and interference management.

21. The method of claim 19, wherein the radio protocol architecture further comprises a RRC-PHY control SAP, and the step of transferring the RRC information comprises exchanging (S910), via the RRC-PHY control SAP, RRC control information between the CPS-H unit a PHY unit arranged to implement the PHY layer.

22. The method of claim 21, wherein the radio protocol architecture further comprises a RRC control SAP, a RRC-CS control SAP, and a RRC-MAC control SAP, and the step of transferring the RRC information further comprises:

receiving, via the RRC control SAP, RRC control information from a higher layer above the L3 layer;

converting the received RRC control information into control information units;

providing, via the RRC-CS control SAP, the converted control information units to a CS unit arranged to implement the CS sublayer or providing, via the RRC-MAC control SAP, the converted control information units to a CPS-L unit arranged to implement the CPS-L sublayer;

receiving, via the RRC-CS control SAP, the control information units from the CS unit or receiving, via the RRC-MAC control SAP, the control information units from the CPS-L unit;

converting the received control information units to RRC control information; and providing, via the RRC control SAP, the converted RRC control information to the higher protocol layer.

23. The method of claim 19, wherein the radio protocol architecture further comprises a RRC data SAP, a RRC-CS data SAP, and a RRC-MAC data SAP, and the step of transferring the user data between the units of the node comprises:

receiving, via the RRC data SAP, higher layer PDUs from the higher layer;

converting the received higher layer PDUs into RRC-SDUs;

providing, via the RRC-CS data SAP, the converted RRC-SDUs to the CS unit or providing, via the RRC-MAC data SAP, the converted RRC-SDUs to the CPS-L unit;

receiving, via the RRC-CS data SAP, the RRC-SDUs from the CS unit or receiving, via the RRC-MAC data SAP, from the CPS-L unit;

converting the received RRC-SDUs to the higher layer PDUs; and providing, via the RRC data SAP, the converted higher layer PDUs to the higher layer.

24. The method of claim 19, wherein the step of transferring the RRC information comprises providing RLC and MAC functionalities using a CPS-L unit arranged to implement the CPS-L sublayer, and wherein the RLC and the MAC functionalities include one or more of ARQ, PDU segmentation and delivery, PDU packing and unpacking, PDU multiplexing and demultiplexing, PDU fragmenting and defragmenting, and scheduling.

25. The method of claim 19, wherein the radio protocol architecture further comprises a RRC-MAC control SAP, a CS-MAC control SAP, and a MAC-PHY control SAP, and the step of transferring the RRC information comprises:

receiving, via the RRC-MAC control SAP, control information units from the CPS-H unit arranged to implement the CPS-H sublayer or receiving, via the CS-MAC control SAP, CS-SDUs containing the control information from the CS unit arranged to implement the CS sublayer;

converting the received control information units or the CS-SDUs containing the control information into MAC PDUs containing management information;

providing, via the MAC-PHY control SAP, the MAC PDUs containing the management information to the PHY unit;

receiving, via the MAC-PHY control SAP, the MAC PDUs containing the management information from the PHY unit;

converting the received MAC PDUs containing the management information into the CS-SDUs containing the control information or into the control information units; and providing, via the RRC-MAC control SAP, the converted control information units to the CPS-H unit or providing, via the CS-MAC control SAP, the converted CS-SDUs containing the control information to the CS unit.

26. The method of claim 19, wherein the radio protocol architecture further comprises a RRC-MAC data SAP, a CS-MAC data SAP, and a MAC-PHY data SAP, and the step of transferring the user data between the units of the node comprises:

receiving, via the RRC-MAC data SAP, the RRC-SDUs from the CPS-H unit or receiving, via the CS-MAC data SAP, CS-SDUs containing user data from the CS unit;

converting the received RRC-SDUs or the CS-SDUs containing the user data into MAC PDUs containing the user data;

providing, via the MAC-PHY data SAP, the MAC PDUs containing the user data to the PHY unit;

receiving, via the MAC-PHY data SAP, the MAC PDUs containing the user data from the PHY unit;

converting the received MAC PDUs containing the user data into the CS-SDUs containing the user data or into the RRC-SDUs; and providing, via the RRC-MAC data SAP, the converted RRC-SDUs to the CPS-H unit or providing, via the CS-MAC data SAP, the converted CS-SDUs containing the user data to the CS unit.

27. The method of claim 19,
wherein the step of transferring the RRC information comprises providing service specific convergence functionalities using a CS unit arranged to implement the CS sublayer, and
wherein the service specific convergence functionalities include one or more of transforming and mapping higher layer PDUs from the higher layer unit, classifying and associating the higher layer PDUs to service flow identifiers (SFID) and to connection identifiers (CID), convert the higher layer PDUs into CS-SDUs, and provide payload header suppression/compression (PHS) services.

28. The method of claim 19, wherein
the radio protocol architecture further comprises a CS control SAP, a RRC-CS control SAP, and a CS-MAC control SAP, and
the step of transferring the RRC information comprises:
  receiving, via the CS control SAP, RRC control information from a higher layer above the L3 layer or receiving, via the RRC-CS control SAP, control information units from a CPS-H unit arranged to implement the CPS-H sublayer;
  converting the received RRC control information or the received control information units into CS-SDUs containing control information;
  providing, via the CS-MAC control SAP, the CS-SDUs containing the control information to a CPS-L unit arranged to implement the CPS-L sublayer;
  receiving, via the CS-MAC control SAP, the CS-SDUs containing the control information from the CPS-L unit;
  converting the received CS-SDUs containing the control information into the RRC control information or into the control information units; and
  providing, via the CS control SAP, the converted RRC control information to the higher layer or providing, via the RRC-CS control SAP, the converted control information units to the CPS-H unit.

29. The method of claim 28, wherein
the radio protocol architecture further comprises a CS data SAP, a RRC-CS data SAP, and a CS-MAC data SAP, and
the step of transferring the user data between the units of the node comprises:
  receiving, via the CS data SAP, higher layer PDUs from the higher layer or receiving, via the RRC-CS data SAP, RRC-SDUs from the CPS-H unit;
  converting the received higher layer PDUs or the received RRC-SDUs into CS-SDUs containing user data
  providing, via the CS-MAC data SAP, the CS-SDUs containing the user data to the CPS-L unit;
  receiving, via the CS-MAC data SAP, the CS-SDUs containing the user data from the CPS-L unit;
  converting the received CS-SDUs containing the user data into the higher layer PDUs or into the RRC-SDUs; and
  providing, via the CS data SAP, the higher layer PDUs to the higher layer or providing, via the RRC-CS data SAP, the converted RRC-SDUs to the CPS-H unit.

30. The method of claim 19, wherein
the radio protocol architecture is orthogonally divided into a management plane, a control plane separate from the management plane, and a user plane separate from the management and the control planes,
the management plane is associated with network management functionalities,
the control plane is associated with radio control functionalities,
the data plane is associated with data transport functionalities,
the node is a BS and the second node is a MS, and
the step of transferring the RRC information comprises:
  maintaining the management plane related information in a management information base (MIB); and
  maintaining the control plane related information in a control information base (CIB), wherein
  the CIB is separate from the MIB.

31. The method of claim 30, wherein
the control plane related information maintained in the CIB comprises radio control signaling information related the radio link between the BS and the MS including one or more of signal strength, modulation, signal-to-noise ratio, BS state, MS state, and MS mobility, and
the management plane related information maintained in the MIB includes any one or more of network node installation, network configuration, network resource monitoring, and network alarms, and MS subscription information.

32. The method of claim 31, wherein the MIB is maintained externally of the BS.

* * * * *